US012016013B2

(12) United States Patent
Wu et al.

(10) Patent No.: US 12,016,013 B2
(45) Date of Patent: Jun. 18, 2024

(54) METHOD AND DEVICE USED FOR UE AND BASE STATION IN WIRELESS COMMUNICATION

(71) Applicants: Keying Wu, Shanghai (CN); Xiaobo Zhang, Shanghai (CN); Lin Yang, Shanghai (CN)

(72) Inventors: Keying Wu, Shanghai (CN); Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 536 days.

(21) Appl. No.: 17/241,083

(22) Filed: Apr. 27, 2021

(65) Prior Publication Data

US 2021/0266935 A1    Aug. 26, 2021

Related U.S. Application Data

(63) Continuation of application No. PCT/CN2019/110594, filed on Oct. 11, 2019.

(30) Foreign Application Priority Data

Nov. 2, 2018    (CN) .......................... 201811301289.5

(51) Int. Cl.
*H04W 72/1268*    (2023.01)
*H04L 5/00*    (2006.01)
(Continued)

(52) U.S. Cl.
CPC ....... *H04W 72/1268* (2013.01); *H04L 5/0051* (2013.01); *H04W 24/10* (2013.01);
(Continued)

(58) Field of Classification Search
CPC ............. H04W 72/1268; H04W 24/10; H04W 72/0446; H04W 72/0453; H04W 72/0473;
(Continued)

(56) References Cited

U.S. PATENT DOCUMENTS

2018/0084586 A1    3/2018  McCoy et al.
2020/0036555 A1*   1/2020  Davydov ............ H04L 25/0224
2021/0320775 A1*  10/2021  Miao .................... H04L 5/0035

FOREIGN PATENT DOCUMENTS

CN       106160992 A     11/2016
CN       106851826 A      6/2017
(Continued)

OTHER PUBLICATIONS

Huawei et al."Uplink Power Control" 3GPP TSG RAN WG1 Meeting#86,R1-167226,Aug. 26, 2016.
(Continued)

*Primary Examiner* — Charles C Jiang
*Assistant Examiner* — Shawn D Miller

(57) ABSTRACT

The present disclosure provides a method and a device for UE and a base station in wireless communications. A UE receives a first signaling; and transmits a first radio signal. herein, the first signaling comprises scheduling information of the first radio signal; a first reference signal is used to determine at least one of transmitting power of the first radio signal or one or more antenna ports for transmitting the first radio signal; a first radio resource is associated with the first reference signal, and the first radio resource is related to the first signaling; the first signaling does not comprise a first field, the first field indicating one or more antenna ports for transmitting a radio signal scheduled by a signaling to which the first field belongs. The method ensures the reliability of uplink transmission for any TRP/panel when one UE is served by multiple TRPs/panels.

20 Claims, 6 Drawing Sheets

(51) Int. Cl.
  *H04W 24/10*    (2009.01)
  *H04W 72/044*   (2023.01)
  *H04W 72/0446*  (2023.01)
  *H04W 72/0453*  (2023.01)
  *H04W 72/50*    (2023.01)

(52) U.S. Cl.
  CPC ... *H04W 72/0446* (2013.01); *H04W 72/0453* (2013.01); *H04W 72/0473* (2013.01); *H04W 72/535* (2023.01)

(58) Field of Classification Search
  CPC ... H04W 72/535; H04W 72/23; H04W 24/08; H04L 5/0051; H04L 5/0048; H04L 5/0023; H04L 5/0094; H04L 5/0053; H04B 7/0413
  See application file for complete search history.

(56) References Cited

FOREIGN PATENT DOCUMENTS

| CN | 107734686 A | 2/2018 |
| CN | 107634821 A | 6/2020 |
| CN | 107888238 A | 9/2020 |

OTHER PUBLICATIONS

CN201811301289.5 Second Office Action dated Mar. 18, 2021.
CN201811301289.5 First Search Report dated Oct. 26, 2020.
CN201811301289.5 First Search Report dated Oct. 19, 2020.
ISR received in application No. PCT/CN2019/110594 dated Jan. 8, 2020.

\* cited by examiner first reference signal —used to determine→ transmitting power of first radio signal first reference signal —used to determine→ transmission antenna port of first radio signal first radio resource —being associated with→ first reference signal first radio resource —being associated with→ first reference signal

METHOD AND DEVICE USED FOR UE AND BASE STATION IN WIRELESS COMMUNICATION

CROSS REFERENCE TO RELATED APPLICATIONS

This application is a continuation of International Application No. PCT/CN2019/110594, filed Oct. 11, 2019, claims the priority benefit of Chinese Patent Application No. 201811301289.5, filed on Nov. 2, 2018, the full disclosure of which is incorporated herein by reference.

BACKGROUND

Technical Field

The present disclosure relates to methods and devices used in wireless communication systems, and in particular to a method and device in a wireless communication system supporting multi-antenna transmissions.

Related Art

Today Massive MIMO has become a hot topic of studies on the next generation mobile communications. In Massive MIMO, multiple antennas form through beamforming a narrow beam pointing in a specific direction to improve communication quality. Generally, beams formed through multi-antenna beamforming are narrow, so that beams of a base station and a User Equipment (UE) shall be aligned to facilitate effective communications. To ensure that a UE can use a proper beam to receive or transmit data, a base station will transmit beam indication information in a scheduling signaling. If the scheduling signaling does not comprise beam indication information, the UE will use a beam associated with a pre-defined or default control channel to receive/transmit data.

For the purpose of improving the robustness of communications and a single UE's transmission rate, a UE can be served by multiple Transmitter Receiver Point (TRPs) or panels simultaneously. The multiple TRPs or panels can transmit the same data to enhance the communication reliability of the UE, or transmit different data to increase the UE's throughput.

SUMMARY

Inventors find through researches that the UE ought to employ different beams and/or different power control parameters for different TRP/panel transmissions. Using a beam/power control parameter for a TRP/panel to transmit data for another TRP/panel will lead to a significant reduction in transmission performance.

To address the above problem, the present disclosure provides a solution. It should be noted that if no conflict is incurred, the embodiments of the UE in the present disclosure and the characteristics in the embodiments can be applied to the base station, and vice versa. And the embodiments in the present disclosure and characteristics in the embodiments can be mutually combined if there is no conflict.

The present disclosure provides a method in a UE for wireless communications, comprising:
receiving a first signaling; and
transmitting a first radio signal;

herein, the first signaling comprises scheduling information of the first radio signal; a first reference signal is used to determine at least one of transmitting power of the first radio signal or one or more antenna ports for transmitting the first radio signal; a first radio resource is associated with the first reference signal, and the first radio resource is related to the first signaling; the first signaling does not comprise a first field, the first field indicating one or more antenna ports for transmitting a radio signal scheduled by a signaling to which the first field belongs.

In one embodiment, a problem to be solved in the present disclosure is how to avoid using a beam and/or a transmitting power for a TRP/panel to transmit data for another TRP/panel when a scheduling signaling does not comprise beam indication information on the condition that a same UE is served by multiple TRPs/panels. The method proposed above solves the problem by creating an implicit connection between the first signaling and the first radio resource.

In one embodiment, the above method is characterized in that a spatial domain transmission filter and/or transmitting power obtained through the first reference signal is for a target receiver of the first radio signal, and the first signaling is used for implicitly determining the first reference signal.

In one embodiment, the above method is characterized in that a transmission antenna port corresponding to the first signaling, a TCI-State corresponding to the first signaling and a time-frequency resource occupied by the first signaling are used for implicitly determining the first reference signal.

In one embodiment, the above method is advantageous in that the UE always uses a spatial domain transmission filter and/or transmitting power for the target receiver of the first radio signal to transmit the first radio signal, thus guaranteeing the reliability of an uplink transmission for any TRP/panel.

In one embodiment, the above method is advantageous in implicitly determining the first reference signal through the first signaling, thus avoiding extra signaling overhead brought about by explicit indication.

According to one aspect of the present disclosure, a time-frequency resource occupied by the first signaling belongs to a first time-frequency resource set, and the first time-frequency resource set is associated with a second reference signal; the first radio resource is related to the second reference signal.

According to one aspect of the present disclosure, one antenna port for transmitting the first reference signal is Quasi-Co-Located (QCL) with one antenna port for transmitting the second reference signal.

According to one aspect of the present disclosure, a measurement on the second reference signal is used to determine one or more antenna ports for transmitting the first reference signal.

According to one aspect of the present disclosure, the first radio resource is a radio resource in a first radio resource set; the first radio resource set is a candidate resource set of K candidate resource sets, K being a positive integer greater than 1, and any of the K candidate resource sets comprising at least one radio resource; the first signaling is used to determine the first radio resource set out of the K candidate resource sets.

According to one aspect of the present disclosure, the first radio resource is in a fixed position in the first radio resource set.

According to one aspect of the present disclosure, comprising:

receiving first information;

herein, the first information is used to determine K reference signal sets, the K reference signal sets respectively correspond to the K candidate resource sets, and a first reference signal set is one of the K reference signal sets that corresponds to the first radio resource set; a target radio resource is any radio resource in the first radio resource set, and the target radio resource is associated with a target reference signal; one antenna port for transmitting the target reference signal is QCL with one antenna port for transmitting a reference signal in the first reference signal set, or, a measurement on a reference signal in the first reference signal set is used to determine one or more antenna ports for transmitting the target reference signal.

According to one aspect of the present disclosure, comprising:

receiving second information;

herein, the second information comprises configuration information of the first reference signal.

According to one aspect of the present disclosure, comprising:

operating the first reference signal;

herein, the operating is receiving, or, the operating is transmitting.

According to one aspect of the present disclosure, comprising:

receiving third information;

herein, the third information indicates the first radio resource.

The present disclosure provides a method in a base station for wireless communications, comprising:

transmitting a first signaling; and receiving a first radio signal;

herein, the first signaling comprises scheduling information of the first radio signal; a first reference signal is used to determine at least one of transmitting power of the first radio signal or one or more antenna ports for transmitting the first radio signal; a first radio resource is associated with the first reference signal, and the first radio resource is related to the first signaling; the first signaling does not comprise a first field, the first field indicating one or more antenna ports for transmitting a radio signal scheduled by a signaling to which the first field belongs.

According to one aspect of the present disclosure, a time-frequency resource occupied by the first signaling belongs to a first time-frequency resource set, and the first time-frequency resource set is associated with a second reference signal; the first radio resource is related to the second reference signal.

According to one aspect of the present disclosure, one antenna port for transmitting the first reference signal is QCL with one antenna port for transmitting the second reference signal.

According to one aspect of the present disclosure, a measurement on the second reference signal is used to determine one or more antenna ports for transmitting the first reference signal.

According to one aspect of the present disclosure, the first radio resource is a radio resource in a first radio resource set; the first radio resource set is a candidate resource set of K candidate resource sets, K being a positive integer greater than 1, and any of the K candidate resource sets comprising at least one radio resource; the first signaling is used to determine the first radio resource set out of the K candidate resource sets.

According to one aspect of the present disclosure, the first radio resource is in a fixed position in the first radio resource set.

According to one aspect of the present disclosure, comprising:

transmitting first information;

herein, the first information is used to determine K reference signal sets, the K reference signal sets respectively correspond to the K candidate resource sets, and a first reference signal set is one of the K reference signal sets that corresponds to the first radio resource set; a target radio resource is any radio resource in the first radio resource set, and the target radio resource is associated with a target reference signal; one antenna port for transmitting the target reference signal is QCL with one antenna port for transmitting a reference signal in the first reference signal set, or, a measurement on a reference signal in the first reference signal set is used to determine one or more antenna ports for transmitting the target reference signal.

According to one aspect of the present disclosure, comprising:

transmitting second information;

herein, the second information comprises configuration information of the first reference signal.

According to one aspect of the present disclosure, comprising:

executing the first reference signal;

herein, the executing is transmitting, or, the executing is receiving.

According to one aspect of the present disclosure, comprising:

transmitting third information;

herein, the third information indicates the first radio resource.

The present disclosure provides a UE for wireless communications, comprising:

a first receiver, receiving a first signaling; and a first processor, transmitting a first radio signal;

herein, the first signaling comprises scheduling information of the first radio signal; a first reference signal is used to determine at least one of transmitting power of the first radio signal or one or more antenna ports for transmitting the first radio signal; a first radio resource is associated with the first reference signal, and the first radio resource is related to the first signaling; the first signaling does not comprise a first field, the first field indicating one or more antenna ports for transmitting a radio signal scheduled by a signaling to which the first field belongs.

The present disclosure provides a base station for wireless communications, comprising:

a first transmitter, transmitting a first signaling; and a second processor, receiving a first radio signal;

herein, the first signaling comprises scheduling information of the first radio signal; a first reference signal is used to determine at least one of transmitting power of the first radio signal or one or more antenna ports for transmitting the first radio signal; a first radio resource is associated with the first reference signal, and the first radio resource is related to the first signaling; the first signaling does not comprise a first field, the first field indicating one or more antenna ports for transmitting a radio signal scheduled by a signaling to which the first field belongs.

In one embodiment, the present disclosure has the following advantages compared with the prior art:

With one UE being served by multiple TRPs/panels, a reduction in transmission quality resulting from transmitting data for one TRP/panel with a spatial domain transmission filter and/or transmitting power for another TRP/panel can be avoided when no beam indication information is comprised in a scheduling signaling.

By determining a spatial domain transmission filter and/or transmitting power for the target receiver of the current uplink transmission implicitly through a scheduling signaling, the reliability of the uplink transmission for any TRP/panel can be guaranteed, and meanwhile extra signaling overhead caused by explicit indication can be avoided.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
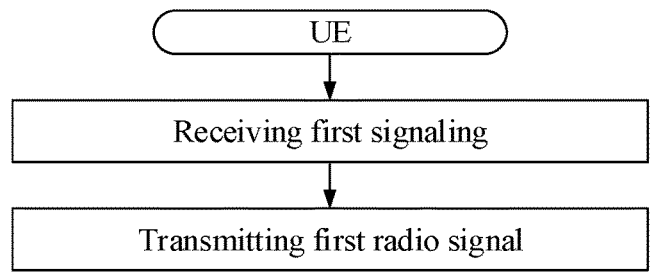
FIG. 1 illustrates a flowchart of a first signaling and a first radio signal according to one embodiment of the present disclosure.

Embodiment 1 illustrates a flowchart of a first signaling and a first radio signal, as shown in FIG. 1.

In Embodiment 1, the UE in the present disclosure receives a first signaling; and transmits a first radio signal. Herein, the first signaling comprises scheduling information of the first radio signal; a first reference signal is used to determine at least one of transmitting power of the first radio signal or one or more antenna ports for transmitting the first radio signal; a first radio resource is associated with the first reference signal, and the first radio resource is related to the first signaling; the first signaling does not comprise a first field, the first field indicating one or more antenna ports for transmitting a radio signal scheduled by a signaling to which the first field belongs.

In one embodiment, the first signaling is a physical layer signaling.

In one embodiment, the first signaling is a dynamic signaling.

In one embodiment, the first signaling is a L1 signaling.

In one embodiment, the first signaling is a L1 control signaling.

In one embodiment, the first signaling is a dynamic signaling used for UpLink Grant.

In one embodiment, the first signaling comprises Downlink Control Information (DCI).

In one embodiment, the first signaling comprises DCI used for UpLink Grant.

In one embodiment, the first signaling is UE-specific.

In one embodiment, the first signaling comprises DCI identified by a Cell-Radio Network Temporary Identifier (C-RNTI).

In one embodiment, a format of the first signaling is DCI format 0_0, and the specific definition of the DCI format 0_0 can be found in 3GPP TS38.212.

In one embodiment, the first signaling indicates scheduling information of the first radio signal.

In one embodiment, the first signaling explicitly indicates scheduling information of the first radio signal.

In one embodiment, scheduling information of the first radio signal comprises at least one of an occupied time-domain resource, an occupied frequency-domain resource, a Modulation and Coding Scheme (MCS), configuration information of DeModulation Reference Signals (DMRS), a Hybrid Automatic Repeat reQuest (HARQ) process ID, a Redundancy Version (RV), a New Data Indicator (NDI) or corresponding Spatial Rx parameters.

In one embodiment, the configuration information of DMRS comprises one or more of an occupied time-domain resource, an occupied frequency-domain resource, an occupied code-domain resource, an RS sequence, a mapping mode, a DMRS type, a cyclic shift, an Orthogonal Cover Code (OCC), $w_f(k')$, or $w_t(l')$. The $w_f(k')$ and the $w_t(l')$ are respectively a frequency-domain spreading sequence and a time-domain spreading sequence, and the specific definitions of the $w_f(k')$ and the $w_t(l')$ can be found in 3GPP TS38.211, section 6.4.1.

In one embodiment, the first reference signal comprises a Synchronization Signal/Physical Broadcast Channel block (SS/PBCH block).

In one embodiment, the first reference signal comprises Channel-State Information Reference Signals (CSI-RS).

In one embodiment, the first reference signal comprises a Sounding Reference Signal (SRS).

In one embodiment, the first reference signal is used for determining transmitting power of the first radio signal.

In one embodiment, a measurement on the first reference signal is used to determine a first pathloss, and the transmitting power of the first radio signal is linear with the first pathloss.

In one embodiment, the first reference signal is used to determine an antenna port for transmitting the first radio signal.

In one embodiment, the phrase that the first reference signal is used to determine an antenna port for transmitting the first radio signal includes that the first reference signal is used to determine a spatial domain transmission filter corresponding to the first radio signal.

In one embodiment, the phrase that the first reference signal is used to determine an antenna port for transmitting the first radio signal includes that the first reference signal is used to determine a precoder corresponding to the first radio signal.

In one embodiment, the phrase that the first reference signal is used to determine an antenna port for transmitting the first radio signal includes that the first reference signal is used to determine a precoder corresponding to DMRS of the first radio signal.

In one embodiment, the phrase that the first reference signal is used to determine an antenna port for transmitting the first radio signal includes that the first reference signal is used to determine a spatial relation corresponding to DMRS of the first radio signal.

In one embodiment, the phrase that the first reference signal is used to determine an antenna port for transmitting the first radio signal includes that one antenna port for transmitting DMRS of the first radio signal is quasi-co-located with one antenna port for transmitting the first reference signal.

In one embodiment, the phrase that the first reference signal is used to determine an antenna port for transmitting the first radio signal includes that the UE employs a same spatial domain transmission filter to transmit the first radio signal and receive the first reference signal.

In one embodiment, the phrase that the first reference signal is used to determine an antenna port for transmitting the first radio signal includes that the UE employs a same spatial domain transmission filter to transmit DMRS corresponding to the first radio signal and receive the first reference signal.

In one embodiment, the first reference signal is used to determine transmitting power of the first radio signal and an antenna port for transmitting the first radio signal.

In one embodiment, the first radio signal and the first signaling correspond to a same spatial relation.

In one embodiment, the first radio signal and the first radio resource correspond to a same spatial relation.

In one embodiment, the UE employs a same spatial domain transmission filter to transmit the first radio signal and to transmit a radio signal on the first radio resource.

In one embodiment, the UE employs a same spatial domain transmission filter to transmit DMRS corresponding to the first radio signal and transmit a radio signal on the first radio resource.

In one embodiment, one antenna port for transmitting the first radio signal is quasi-co-located with one antenna port for transmitting a radio signal transmitted on the first radio resource.

In one embodiment, the first radio resource comprises a Physical Uplink Control CHannel (PUCCH) resource.

In one embodiment, the first radio resource is a PUCCH resource.

In one embodiment, the first radio resource comprises a PUCCH resource set.

In one embodiment, the first radio resource is a PUCCH resource set.

In one embodiment, the first radio resource comprises at least the former of a time-frequency resource and a code-domain resource.

In one embodiment, a code-domain resource comprises one or more of pseudo-random sequences, low-PAPR sequences, a cyclic shift, an OCC, an OCC length, an OCC index, an orthogonal sequence, $r_{u,v}^{(\alpha,\delta)}(n)$, $w_i(m)$ or $w_n(m)$. The $r_{u,v}^{(\alpha,\delta)}(n)$ is either a pseudo-random sequence or a low-PAPR sequence, while the $w_i(m)$ and the $w_n(m)$ are respectively orthogonal sequences. The specific meaning of the $r_{u,v}^{(\alpha,\delta)}(n)$, the $w_i(m)$ and the $w_n(m)$ can be found in 3GPP TS38.211, section 6.3.2.

In one embodiment, the first radio resource occupies a positive integer number of Resource Element(s) (RE(s)) in time-frequency domain.

In one embodiment, one RE occupies a multicarrier symbol in time domain and a subcarrier in frequency domain.

In one embodiment, the first radio resource occupies a positive integer number of multicarrier symbol(s) in time domain.

In one embodiment, the first radio resource occupies a positive integer number of consecutive multicarrier symbols in time domain.

In one embodiment, the first radio resource occupies a positive integer number of non-consecutive multicarrier symbols in time domain.

In one embodiment, the first radio resource occupies a positive integer number of subcarrier(s) in frequency domain.

In one embodiment, the first radio resource occupies a positive integer number of consecutive subcarriers in frequency domain.

In one embodiment, the first radio resource occupies a positive integer number of non-consecutive subcarriers in frequency domain.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, a frequency-domain resource occupied by the first radio resource and a frequency-domain resource occupied by the first radio signal belong to a same Bandwidth Part (BWP).

In one embodiment, a frequency-domain resource occupied by the first radio resource and a frequency-domain resource occupied by the first radio signal belong to a same uplink BWP.

In one embodiment, the first signaling is used to determine the first radio resource.

In one embodiment, the phrase that the first radio resource is related to the first signaling includes that a time-frequency resource occupied by the first signaling is used to determine the first radio resource.

In one embodiment, the phrase that the first radio resource is related to the first signaling includes that an antenna port for transmitting the first signaling is used to determine the first radio resource.

In one embodiment, the phrase that the first radio resource is related to the first signaling includes that the first signaling and a second reference signal correspond to a same spatial domain transmission filter, the second reference signal being used to determine the first radio resource.

In one embodiment, the phrase that the first radio resource is related to the first signaling includes that a time-frequency resource occupied by the first signaling belongs to a first time-frequency resource set, and the first time-frequency resource set is associated with a second reference signal, the second reference signal being used to determine the first radio resource.

In one embodiment, the phrase that the first radio resource is related to the first signaling includes that a time-frequency resource occupied by the first signaling belongs to a first time-frequency resource set, and a TCI-State corresponding to the first time-frequency resource set is used to determine the first radio resource.

In one embodiment, the specific definition of the TCI-State can be found in 3GPP TS38.213, section 10.

In one embodiment, the first field comprises part of or all information contained in an SRS resource indicator field, and for the detailed definition of the SRS resource indicator field, refer to 3GPP TS38.212.

In one embodiment, the first field is an SRS resource indicator field, and for the detailed definition of the SRS resource indicator field, refer to 3GPP TS38.212.

In one embodiment, the first signaling comprises a positive integer number of field(s), and an antenna port for transmitting the first radio signal is unrelated to any field comprised in the first signaling.

In one embodiment, the first signaling comprises a positive integer number of field(s), and a spatial domain transmission filter corresponding to the first radio signal is unrelated to any field comprised in the first signaling.

In one embodiment, the first signaling comprises a positive integer number of field(s), and a spatial domain transmission filter corresponding to DMRS of the first radio signal is unrelated to any field comprised in the first signaling.

In one embodiment, the first signaling comprises a positive integer number of field(s), and a precoder corresponding to the first radio signal is unrelated to any field comprised in the first signaling.

In one embodiment, the first signaling comprises a positive integer number of field(s), and a precoder corresponding to DMRS of the first radio signal is unrelated to any field comprised in the first signaling.

Embodiment 2

Figure 2:
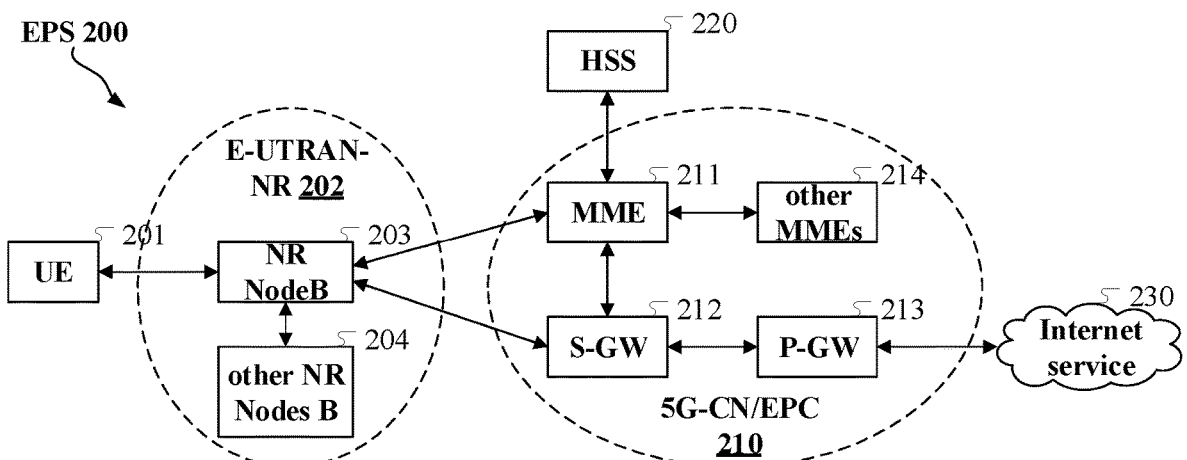
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of Long-Term Evolution (LTE), and Long-Term Evolution Advanced (LTE-A) and future 5G systems. The network architecture 200 of LTE may be called an Evolved Packet System (EPS) 200. The EPS 200 may comprise one or more UEs 201, an E-UTRAN-NR 202, a 5G-CoreNetwork/Evolved Packet Core (5G-CN/EPC) 210, a Home Subscriber Server (HSS) 220 and an Internet Service 230. Herein, UMTS refers to Universal Mobile Telecommunications System. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The E-UTRAN-NR 202 comprises a New Radio (NR) node B (gNB) 203 and other gNBs 204. The gNB 203 provides UE 201-oriented user plane and control plane protocol terminations. The gNB 203 may be connected to other gNBs 204 via an X2 interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistant (PDA), Satellite Radios, Global Positioning System (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, automobile, vehicle or some other appropriate terms. The gNB 203 is connected with the 5G-CN/EPC 210 via an S1 interface. The 5G-CN/EPC 210 comprises a Mobility Management Entity (MME) 211, other MMEs 214, a Service Gateway (S-GW) 212 and a Packet Date Network Gateway (P-GW) 213. The MME 211 is a control node for processing a signaling between the UE 201 and the 5G-CN/EPC 210. Generally, the MME 211 provides bearer and connection management. All user Internet Protocol (IP)

packets are transmitted through the S-GW 212; the S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Services.

In one embodiment, the gNB 203 corresponds to the base station in the present disclosure.

In one embodiment, the UE 201 corresponds to the UE in the present disclosure.

In one embodiment, the gNB 203 supports multi-antenna transmission.

In one embodiment, the UE 201 supports multi-antenna transmission.

Embodiment 3

Figure 3:
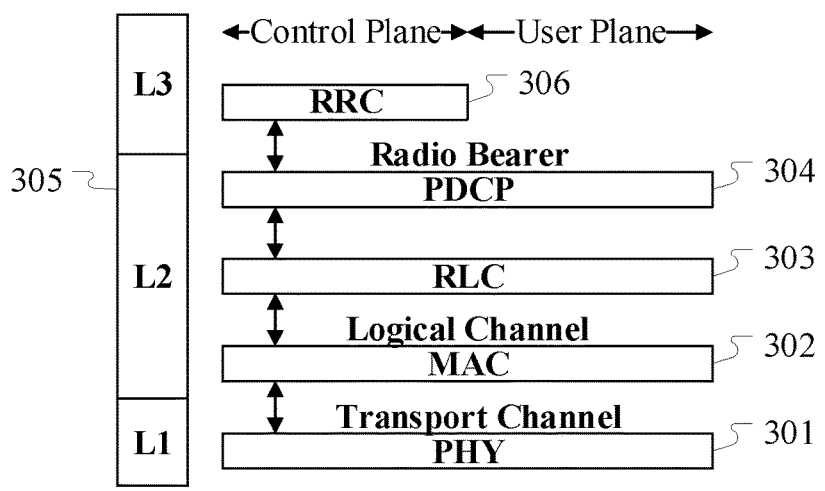
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several protocol layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resource blocks) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the first signaling in the present disclosure is generated by the PHY 301.

In one embodiment, the first radio signal in the present disclosure is generated by the PHY 301.

In one embodiment, the first reference signal in the present disclosure is generated by the PHY 301.

In one embodiment, the second reference signal in the present disclosure is generated by the PHY 301.

In one embodiment, the first information in the present disclosure is generated by the RRC sublayer 306.

In one embodiment, the first information in the present disclosure is generated by the MAC sublayer 302.

In one embodiment, the first information in the present disclosure is generated by the PHY 301.

In one embodiment, the second information in the present disclosure is generated by the RRC sublayer 306.

In one embodiment, the third information in the present disclosure is generated by the RRC sublayer 306.

Embodiment 4

Figure 4:
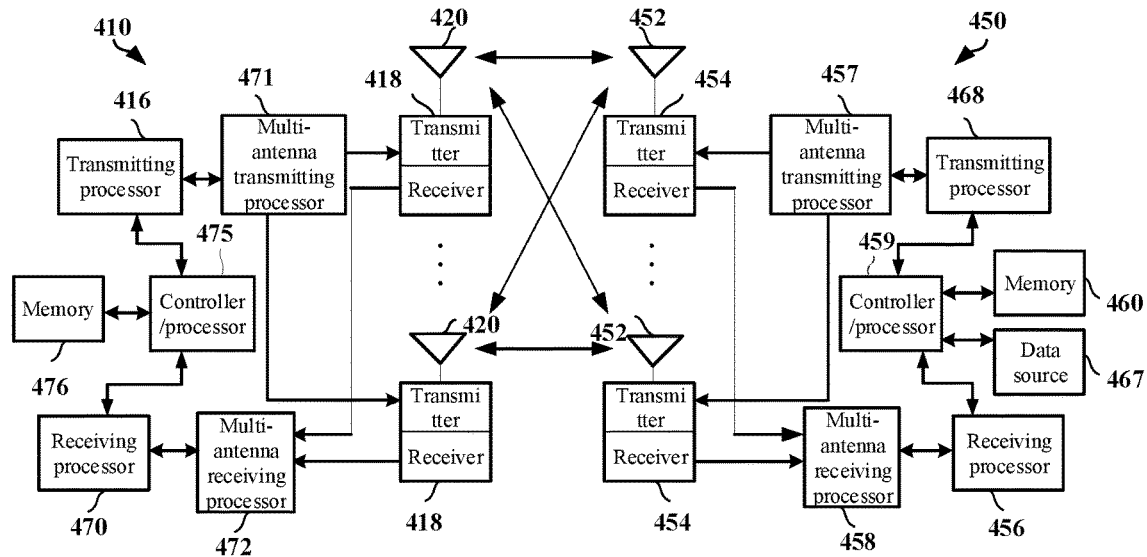
FIG. 4 illustrates a schematic diagram of a New Radio (NR) node and a UE according to one embodiment of the present disclosure.

Embodiment 4 illustrates a schematic diagram of a New Radio (NR) node and a UE, as shown in FIG. 4. FIG. 4 is a block diagram illustrating a UE 450 and a gNB 410 that are in communication with each other in access network.

The gNB 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The UE 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In downlink (DL) transmission, at the gNB 410, a higher-layer packet from a core network is provided to the controller/processor 475. The controller/processor 475 provides functions of the L2 layer. In DL transmission, the controller/processor 475 provides header compression, encryption, packet segmentation and reordering, and multiplexing between a logical channel and a transport channel, and radio resource allocation for the UE 450 based on various priorities. The controller/processor 475 is also in charge of HARQ operation, retransmission of a lost packet, and a signaling to the UE 450. The transmitting processor 416 and the multi-antenna transmitting processor 471 perform signal processing functions used for the L1 layer (that is, PHY). The transmitting processor 416 performs coding and interleaving so as to ensure an FEC (Forward Error Correction) at the UE 450 side, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In downlink (DL) transmission, at the UE 450, each receiver 454 receives a signal via a corresponding antenna 452. Each receiver 454 recovers information modulated onto the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any UE 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the gNB 410. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In DL, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In uplink (UL) transmission, at the UE 450, the data source 467 is used to provide a higher-layer packet to the controller/processor 459. The data source 467 represents all protocol layers above the L2 layer. Similar to a transmitting function of the gNB 410 described in DL transmission, the controller/processor 459 performs header compression, encryption, packet segmentation and reordering, and multiplexing between a logical channel and a transport channel based on radio resource allocation of the gNB 410 so as to provide the L2 layer functions used for the user plane and the control plane. The controller/processor 459 is also responsible for HARQ operation, retransmission of a lost packet, and a signaling to the gNB 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In uplink (UL) transmission, the function of the gNB 410 is similar to the receiving function of the UE 450 described in DL transmission. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be associated with the memory 476 that stores program code and data. The memory 476 can be called a computer readable medium. In UL transmission, the controller/processor 475 provides demultiplexing between a transport channel and a logical channel, packet reassembling, decryption, header decompression, control signal processing so as to recover a higher-layer packet from the UE 450. The higher-layer packet coming from the controller/processor 475 may be provided to the core network. The controller/processor 475 can also perform error detection using ACK and/or NACK protocols to support HARQ operation.

In one embodiment, the UE 450 comprises at least one processor and at least one memory. The at least one memory includes computer program codes. The at least one memory and the computer program codes are configured to be used in collaboration with the at least one processor. The UE 450 at least receives the first signaling in the present disclosure; and transmits the first radio signal in the present disclosure. Herein, the first signaling comprises scheduling information of the first radio signal; a first reference signal is used to determine at least one of transmitting power of the first radio signal or one or more antenna ports for transmitting the first radio signal; a first radio resource is associated with the first reference signal, and the first radio resource is related to the first signaling; the first signaling does not comprise a first field, the first field indicating one or more antenna ports for transmitting a radio signal scheduled by a signaling to which the first field belongs.

In one embodiment, the UE 450 comprises a memory that stores a computer readable instruction program. The computer readable instruction program generates actions when executed by at least one processor. The actions include: receiving the first signaling in the present disclosure; and transmitting the first radio signal in the present disclosure. Herein, the first signaling comprises scheduling information of the first radio signal; a first reference signal is used to determine at least one of transmitting power of the first radio signal or one or more antenna ports for transmitting the first radio signal; a first radio resource is associated with the first reference signal, and the first radio resource is related to the first signaling; the first signaling does not comprise a first field, the first field indicating one or more antenna ports for transmitting a radio signal scheduled by a signaling to which the first field belongs.

In one embodiment, the gNB 410 comprises at least one processor and at least one memory. The at least one memory includes computer program codes. The at least one memory and the computer program codes are configured to be used in collaboration with the at least one processor. The gNB 410 at least transmits the first signaling in the present disclosure;

and receives the first radio signal in the present disclosure. Herein, the first signaling comprises scheduling information of the first radio signal; a first reference signal is used to determine at least one of transmitting power of the first radio signal or one or more antenna ports for transmitting the first radio signal; a first radio resource is associated with the first reference signal, and the first radio resource is related to the first signaling; the first signaling does not comprise a first field, the first field indicating one or more antenna ports for transmitting a radio signal scheduled by a signaling to which the first field belongs.

In one embodiment, the gNB 410 comprises a memory that stores a computer readable instruction program. The computer readable instruction program generates actions when executed by at least one processor. The actions include: transmitting the first signaling in the present disclosure; and receiving the first radio signal in the present disclosure. Herein, the first signaling comprises scheduling information of the first radio signal; a first reference signal is used to determine at least one of transmitting power of the first radio signal or one or more antenna ports for transmitting the first radio signal; a first radio resource is associated with the first reference signal, and the first radio resource is related to the first signaling; the first signaling does not comprise a first field, the first field indicating one or more antenna ports for transmitting a radio signal scheduled by a signaling to which the first field belongs.

In one embodiment, the gNB 410 corresponds to the base station in the present disclosure.

In one embodiment, the UE 450 corresponds to the UE in the present disclosure.

In one embodiment, at least one of the antenna 452, the receiver 454, the receiving processor 456, the multi-antenna receiving processor 458, the controller/processor 459, the memory 460 or the data source 467 is used to receive the first signaling in the present disclosure; at least one of the antenna 420, the transmitter 418, the transmitting processor 416, the multi-antenna transmitting processor 471, the controller/processor 475 or the memory 476 is used to transmit the first signaling in the present disclosure.

In one embodiment, at least one of the antenna 420, the receiver 418, the receiving processor 470, the multi-antenna receiving processor 472, the controller/processor 475 or the memory 476 is used to receive the first radio signal in the present disclosure; at least one of the antenna 452, the transmitter 454, the transmitting processor 468, the multi-antenna transmitting processor 457, the controller/processor 459, the memory 460 or the data source 467 is used to transmit the first radio signal in the present disclosure.

In one embodiment, at least one of the antenna 452, the receiver 454, the receiving processor 456, the multi-antenna receiving processor 458, the controller/processor 459, the memory 460 or the data source 467 is used to receive the first reference signal in the present disclosure; at least one of the antenna 420, the transmitter 418, the transmitting processor 416, the multi-antenna transmitting processor 471, the controller/processor 475 or the memory 476 is used to transmit the first reference signal in the present disclosure.

In one embodiment, at least one of the antenna 420, the receiver 418, the receiving processor 470, the multi-antenna receiving processor 472, the controller/processor 475 or the memory 476 is used to receive the first reference signal in the present disclosure; at least one of the antenna 452, the transmitter 454, the transmitting processor 468, the multi-antenna transmitting processor 457, the controller/processor 459, the memory 460 or the data source 467 is used to transmit the first reference signal in the present disclosure.

In one embodiment, at least one of the antenna 452, the receiver 454, the receiving processor 456, the multi-antenna receiving processor 458, the controller/processor 459, the memory 460 or the data source 467 is used to receive the first information in the present disclosure; at least one of the antenna 420, the transmitter 418, the transmitting processor 416, the multi-antenna transmitting processor 471, the controller/processor 475 or the memory 476 is used to transmit the first information in the present disclosure.

In one embodiment, at least one of the antenna 452, the receiver 454, the receiving processor 456, the multi-antenna receiving processor 458, the controller/processor 459, the memory 460 or the data source 467 is used to receive the second information in the present disclosure; at least one of the antenna 420, the transmitter 418, the transmitting processor 416, the multi-antenna transmitting processor 471, the controller/processor 475 or the memory 476 is used to transmit the second information in the present disclosure.

In one embodiment, at least one of the antenna 452, the receiver 454, the receiving processor 456, the multi-antenna receiving processor 458, the controller/processor 459, the memory 460 or the data source 467 is used to receive the third information in the present disclosure; at least one of the antenna 420, the transmitter 418, the transmitting processor 416, the multi-antenna transmitting processor 471, the controller/processor 475 or the memory 476 is used to transmit the third information in the present disclosure.

Embodiment 5

Figure 5:
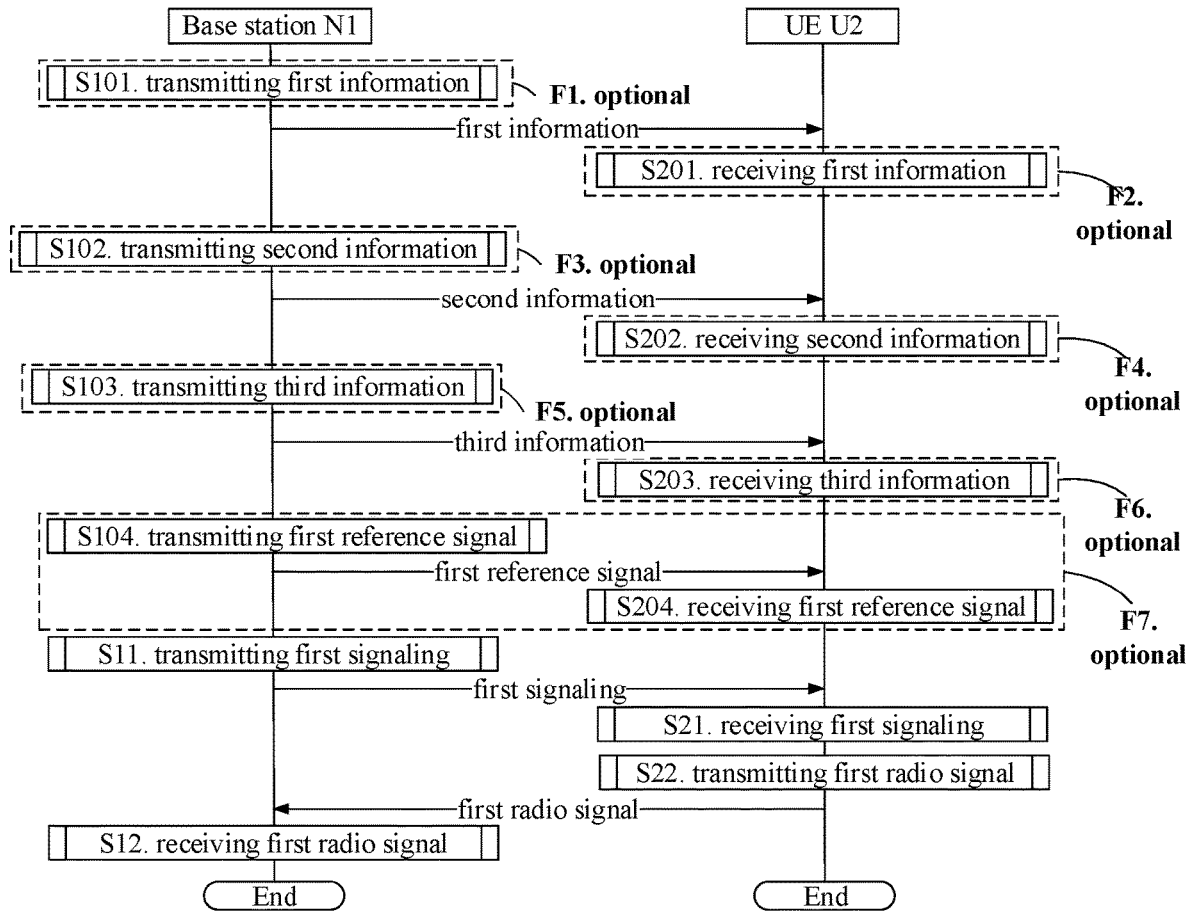
FIG. 5 illustrates a flowchart of wireless transmission according to one embodiment of the present disclosure.

Embodiment 5 illustrates a flowchart of wireless transmission, as shown in FIG. 5. In FIG. 5, a base station N1 is a maintenance base station for a serving cell of a UE U2. Steps marked by boxes from F1 to F7 in FIG. 5 are optional, respectively.

The N1 transmits first information in step S101; transmits second information in step S102; and transmits third information in step S103; transmits a first reference signal in step S104; transmits a first signaling in step S11; and receives a first radio signal in step S12.

The U2 receives first information in step S201; receives second information in step S202; and receives third information in step S203; receives a first reference signal in step S204; receives a first signaling in step S21; and transmits a first radio signal in step S22.

In Embodiment 5, the first signaling comprises scheduling information of the first radio signal; a first reference signal is used by the U2 to determine at least one of transmitting power of the first radio signal or an antenna port for transmitting the first radio signal; a first radio resource is associated with the first reference signal, and the first radio resource is related to the first signaling; the first signaling does not comprise a first field, the first field indicating an antenna port for transmitting a radio signal scheduled by a signaling to which the first field belongs. The first radio resource is a radio resource in a first radio resource set; the first radio resource set is a candidate resource set of K candidate resource sets, K being a positive integer greater than 1, and any of the K candidate resource sets comprising at least one radio resource. The first information is used by the U2 to determine K reference signal sets, the K reference signal sets respectively correspond to the K candidate resource sets. The second information comprises configuration information of the first reference signal. The third information indicates the first radio resource.

In one embodiment, a time-frequency resource occupied by the first signaling belongs to a first time-frequency resource set, and the first time-frequency resource set is associated with a second reference signal; the first radio resource is related to the second reference signal.

In one embodiment, the second reference signal is used to determine the first radio resource.

In one embodiment, the second reference signal indicates the first radio resource.

In one embodiment, the second reference signal explicitly indicates the first radio resource.

In one embodiment, the second reference signal implicitly indicates the first radio resource.

In one embodiment, the UE in the present disclosure receives the second reference signal.

In one embodiment, one antenna port for transmitting the first reference signal is quasi co-located with one antenna port for transmitting the second reference signal.

In one embodiment, the first signaling is used to determine the first radio resource set out of the K candidate resource sets.

In one embodiment, the first radio resource is in a fixed position in the first radio resource set.

In one embodiment, a first reference signal set is one of the K reference signal sets that corresponds to the first radio resource set; a target radio resource is any radio resource in the first radio resource set, and the target radio resource is associated with a target reference signal; one antenna port for transmitting the target reference signal is quasi co-located with one antenna port for transmitting a reference signal in the first reference signal set, or, a measurement on a reference signal in the first reference signal set is used to determine one or more antenna ports for transmitting the target reference signal.

In one embodiment, a first reference signal set is one of the K reference signal sets that corresponds to the first radio resource set; a target radio resource is any radio resource in the first radio resource set, and the target radio resource is associated with a target reference signal; one antenna port for transmitting the target reference signal is quasi co-located with one antenna port for transmitting a reference signal in the first reference signal set.

In one embodiment, a first reference signal set is one of the K reference signal sets that corresponds to the first radio resource set; a target radio resource is any radio resource in the first radio resource set, and the target radio resource is associated with a target reference signal; a measurement on a reference signal in the first reference signal set is used to determine one or more antenna ports for transmitting the target reference signal.

In one embodiment, the UE in the present disclosure receives each reference signal comprised in the K reference signal sets.

In one embodiment, the first signaling is transmitted on a downlink physical layer control channel (i.e., a downlink channel only capable of carrying a physical layer signaling).

In one subembodiment, the downlink physical layer control channel is a Physical Downlink Control CHannel (PDCCH).

In one subembodiment, the downlink physical layer control channel is a short PDCCH (sPDCCH).

In one subembodiment, the downlink physical layer control channel is a New Radio PDCCH (NR-PDCCH).

In one subembodiment, the downlink physical layer control channel is a Narrow Band PDCCH (NB-PDCCH).

In one embodiment, the first radio signal is transmitted on an uplink physical layer data channel (i.e., an uplink channel capable of carrying physical layer data).

In one subembodiment, the uplink physical layer data channel is a Physical Uplink Shared CHannel (PUSCH).

In one subembodiment, the uplink physical layer data channel is a short PUSCH (sPUSCH).

In one subembodiment, the uplink physical layer data channel is a New Radio PUSCH (NR-PUSCH).

In one subembodiment, the uplink physical layer data channel is a Narrow Band PUSCH (NB-PUSCH).

In one embodiment, a transmission channel corresponding to the first radio signal is an Uplink Shared Channel (UL-SCH).

In one embodiment, the first information is transmitted on a downlink physical layer data channel (i.e., a downlink channel capable of carrying physical layer data).

In one subembodiment, the downlink physical layer data channel is a Physical Downlink Shared CHannel (PDSCH).

In one subembodiment, the downlink physical layer data channel is a short PDSCH (sPDSCH).

In one subembodiment, the downlink physical layer data channel is a New Radio PDSCH (NR-PDSCH).

In one subembodiment, the downlink physical layer data channel is a Narrow Band PDSCH (NB-PDSCH).

In one embodiment, the first information is transmitted on a downlink physical layer control channel (i.e., a downlink channel only capable of carrying a physical layer signaling).

In one subembodiment, the downlink physical layer control channel is a PDCCH.

In one subembodiment, the downlink physical layer control channel is an NR-PDCCH.

In one embodiment, the second information is transmitted on a downlink physical layer data channel (i.e., a downlink channel capable of carrying physical layer data).

In one subembodiment, the downlink physical layer data channel is a PDSCH.

In one subembodiment, the downlink physical layer data channel is an NR-PDSCH.

In one embodiment, the third information is transmitted on a downlink physical layer data channel (i.e., a downlink channel capable of carrying physical layer data).

In one subembodiment, the downlink physical layer data channel is a PDSCH.

In one subembodiment, the downlink physical layer data channel is an NR-PDSCH.

Embodiment 6

Figures 6, 7, 8, 9, 10:
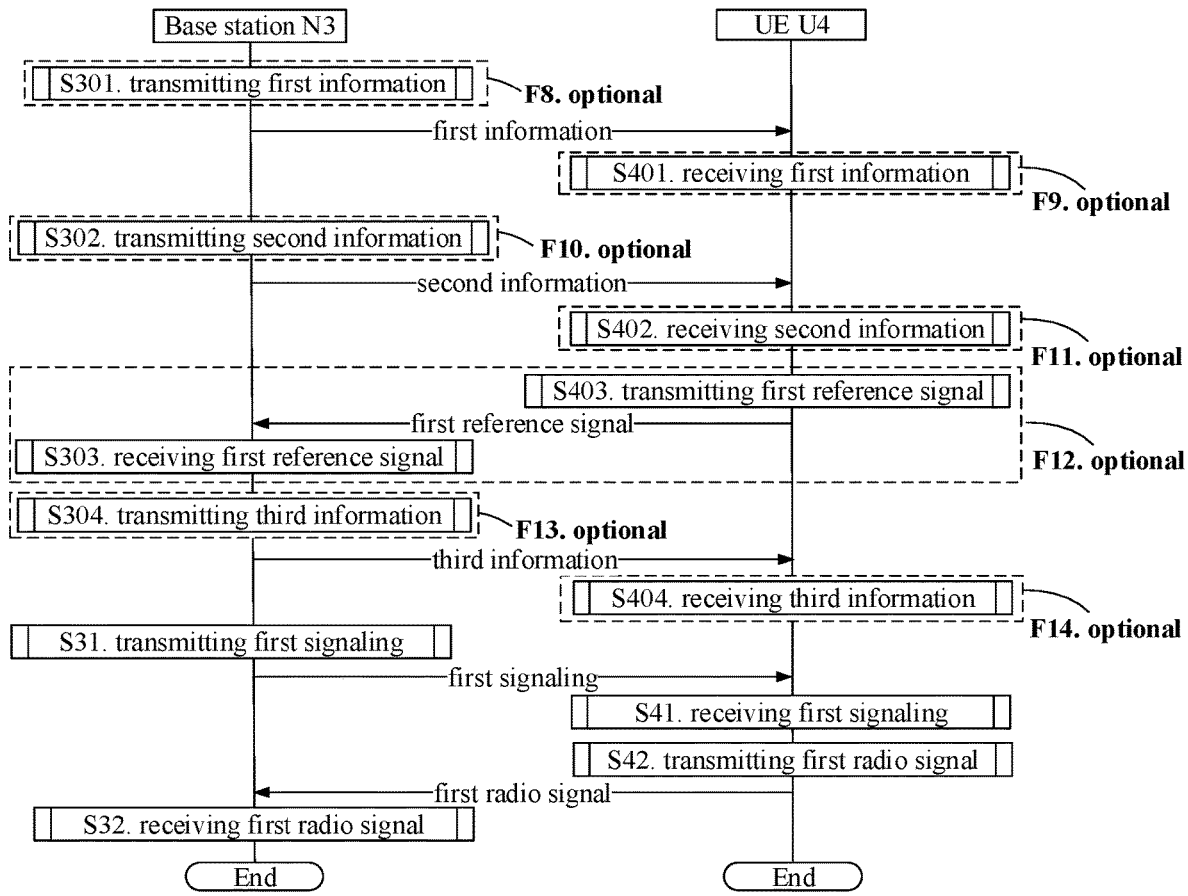
FIG. 6 illustrates a flowchart of wireless transmission according to one embodiment of the present disclosure.
FIG. 7 illustrates a schematic diagram of a first reference signal being used to determine transmitting power of a first radio signal according to one embodiment of the present disclosure.
FIG. 8 illustrates a schematic diagram of a first reference signal being used to determine an antenna port for transmitting a first radio signal according to one embodiment of the present disclosure.
FIG. 9 illustrates a schematic diagram of a first radio resource being associated with a first reference signal according to one embodiment of the present disclosure.
FIG. 10 illustrates a schematic diagram of a first radio resource being associated with a first reference signal according to one embodiment of the present disclosure.

Embodiment 6 illustrates a flowchart of wireless transmission, as shown in FIG. 6. In FIG. 6, a base station N3 is a maintenance base station for a serving cell of a UE U4. Steps marked by the boxes from F8 to F14 in FIG. 6 are optional, respectively.

The N3 transmits first information in step S301; transmits second information in step S302; receives a first reference signal in step S303; transmits third information in step S304; transmits a first signaling in step S31; and receives a first radio signal in step S32.

The U4 receives first information in step S401; receives second information in step S402; transmits a first reference signal in step S403; receives third information in step S404; receives a first signaling in step S41; and transmits a first radio signal in step S42.

In one embodiment, a measurement on the second reference signal is used to determine one or more antenna ports for transmitting the first reference signal.

Embodiment 7

Embodiment 7 illustrates a schematic diagram of a first reference signal being used to determine transmitting power of a first radio signal, as shown in FIG. 7.

In Embodiment 7, the first reference signal is used to determine transmitting power of the first radio signal. A measurement on the first reference signal is used to determine a first pathloss, a first reference power is linear with the first pathloss, and the transmitting power of the first radio signal is a smaller value of the first reference power and a first power threshold.

In one embodiment, the first reference signal is used to determine the transmitting power of the first radio signal.

In one embodiment, the first power threshold is measured in dBm.

In one embodiment, the first reference power is measured in dBm.

In one embodiment, the transmitting power of the first radio signal is measured in dBm.

In one embodiment, the first pathloss is equal to transmitting power of the first reference signal being subtracted by Reference Signal Received Power (RSRP) of the first reference signal.

In one embodiment, the first pathloss is $PL_{b,f,c}(q_d)$, and the specific definition of the $PL_{b,f,c}(q_d)$ can be found in TS38.213.

In one embodiment, a linear coefficient between the first reference power and the first pathloss is a non-negative real number less than or equal to 1.

In one embodiment, a linear coefficient between the first reference power and the first pathloss is $\alpha_{b,f,c}(j)$, and the specific definition of the $\alpha_{b,f,c}(j)$ can be found in TS38.213.

In one embodiment, the first reference power is linear with a first component, and a linear coefficient between the first reference power and the first component is 1.

In one subembodiment, the first component is $P_{O\_PUSCH,b,f,c}(j)$, the $P_{O\_PUSCH,b,f,c}(j)$ being a PUSCH power standard related to a parameter configuration indexed by j on a BWP indexed by b on a carrier indexed by f of a serving cell indexed by c, for the detailed definition of the $P_{O\_PUSCH,b,f,c}(j)$, refer to TS38.213. The first radio signal is transmitted on a BWP indexed by b on a carrier indexed by f of a serving cell indexed by c.

In one embodiment, the first reference power is linear with a second component, the second component is related to a bandwidth occupied by the first radio signal, and a linear coefficient between the first reference power and the second component is 1.

In one subembodiment, the second component is $10 \log_{10}(2^{\mu} M_{RB,b,f,c}^{PUSCH}(i))$, herein, the $M_{RB,b,f,c}^{PUSCH}(i)$ is a bandwidth measured in Resource Blocks (RBs) allocated to a PUSCH in a PUSCH transmission period indexed by i on a BWP indexed by b on a carrier indexed by f of a serving cell indexed by c, the first radio signal is transmitted on a BWP indexed by b on a carrier indexed by f of a serving cell indexed by c, and the y is a subcarrier spacing (SCS) configuration. For the detailed definition of the $10 \log_{10}(2^{\mu} M_{RB,b,f,c}^{PUSCH}(i))$, refer to TS38.213.

In one embodiment, the first reference power is linear with a third component, the third component is related to an MCS employed by the first radio signal, and a linear coefficient between the first reference power and the third component is 1.

In one subembodiment, the third component is $\Delta_{TF,b,f,c}(i)$, the $\Delta_{TF,b,f,c}(i)$ is a power offset related to the MCS employed by the first radio signal in a PUSCH transmission period indexed by i on a BWP indexed by b on a carrier indexed by f of a serving cell indexed by c, and the first radio signal is transmitted on a BWP indexed by b on a carrier indexed by f of a serving cell indexed by c. For the detailed definition of the $\Delta_{TF,b,f,c}(i)$, refer to 3GPP TS38.213.

In one embodiment, the first reference power is linear with a fourth component, the fourth component is a power control adjustment status, and a linear coefficient between the first reference power and the fourth component is 1.

In one subembodiment, the fourth component is $f_{b,f,c}(i,l)$, the $f_{b,f,c}(i,l)$ is a power control adjustment status indexed by l in a PUSCH transmission period indexed by i on a BWP indexed by b on a carrier indexed by f of a serving cell indexed by c, and the first radio signal is transmitted on a BWP indexed by b on a carrier indexed by f of a serving cell indexed by c. For the detailed definition of the $f_{b,f,c}(i,l)$, refer to 3GPP TS38.213.

In one embodiment, the first power threshold is $P_{CMAX,f,c}(i)$, the $P_{CMAX,f,c}(i)$ is a maximum threshold of transmitting power in a PUSCH transmission period indexed by i on a carrier indexed by f of a serving cell indexed by c, and the first radio signal is transmitted on a carrier indexed by f of a serving cell indexed by c. For the detailed definition of the $P_{CMAX,f,c}(i)$, refer to TS38.213.

Embodiment 8

Embodiment 8 illustrates a schematic diagram of a first reference signal being used to determine an antenna port for transmitting a first radio signal; as shown in FIG. 8.

In Embodiment 8, the first reference signal is used to determine an antenna port for transmitting the first radio signal.

In one embodiment, the first reference signal is used to determine a spatial domain transmission filter corresponding to the first radio signal.

In one embodiment, the first reference signal is used to determine a spatial domain transmission filter corresponding to DMRS of the first radio signal.

In one embodiment, the first reference signal is used to determine a precoder corresponding to the first radio signal.

In one embodiment, the first reference signal is used to determine a precoder corresponding to DMRS of the first radio signal.

In one embodiment, the first reference signal is used to determine a spatial relation corresponding to the first radio signal.

In one embodiment, one antenna port for transmitting a DMRS of the first radio signal and one antenna port for transmitting the first reference signal are quasi co-located.

In one embodiment, one antenna port for transmitting the first radio signal and one antenna port for transmitting the first reference signal are quasi co-located.

In one embodiment, any antenna port for transmitting a DMRS of the first radio signal and one antenna port for transmitting the first reference signal are quasi co-located.

In one embodiment, any antenna port for transmitting the first radio signal and one antenna port for transmitting the first reference signal are quasi co-located.

In one embodiment, at least one antenna port for transmitting a DMRS of the first radio signal and one antenna port for transmitting the first reference signal are quasi co-located.

In one embodiment, at least one antenna port for transmitting the first radio signal and one antenna port for transmitting the first reference signal are quasi co-located.

In one embodiment, the UE employs a same spatial domain transmission filter to transmit the first radio signal and the first reference signal.

In one embodiment, the UE employs a same spatial domain transmission filter to transmit a DMRS of the first radio signal and the first reference signal.

In one embodiment, a measurement on the first reference signal is used to determine an antenna port for transmitting the first radio signal.

In one embodiment, a measurement on the first reference signal is used to determine a spatial domain transmission filter corresponding to the first radio signal.

In one embodiment, a measurement on the first reference signal is used to determine a spatial domain transmission filter corresponding to a DMRS of the first radio signal.

In one embodiment, a measurement on the first reference signal is used to determine a precoder corresponding to the first radio signal.

In one embodiment, a measurement on the first reference signal is used to determine a precoder corresponding to a DMRS of the first radio signal.

In one embodiment, the UE employs a same spatial domain transmission filter to transmit the first radio signal and receive the first reference signal.

In one embodiment, the UE employs a same spatial domain transmission filter to transmit a DMRS of the first radio signal and receive the first reference signal.

In one embodiment, a spatial domain receive filter corresponding to the first reference signal is the same as a spatial domain transmission filter corresponding to the first radio signal.

In one embodiment, a spatial domain receive filter corresponding to the first reference signal is the same as a spatial domain transmission filter corresponding to a DMRS of the first radio signal.

Embodiment 9

Embodiment 9 illustrates a schematic diagram of a first radio resource being associated with a first reference signal; as shown in FIG. 9.

In Embodiment 9, the first radio resource is associated with the first reference signal.

In one embodiment, the phrase that the first radio resource is associated with the first reference signal includes that the first reference signal is used to determine a spatial relation of a radio signal transmitted on the first radio resource.

In one embodiment, the phrase that the first radio resource is associated with the first reference signal includes that the first reference signal is used to determine an antenna port for transmitting a radio signal that is transmitted on the first radio resource.

In one embodiment, the phrase that the first radio resource is associated with the first reference signal includes that a measurement on the first reference signal is used to determine an antenna port for transmitting a radio signal that is transmitted on the first radio resource.

In one embodiment, the phrase that the first radio resource is associated with the first reference signal includes that the first reference signal is used to determine a spatial domain transmission filter corresponding to a radio signal transmitted on the first radio resource.

In one embodiment, the phrase that the first radio resource is associated with the first reference signal includes that the first reference signal is used to determine a spatial domain transmission filter corresponding to a DMRS transmitted on the first radio resource.

In one embodiment, the phrase that the first radio resource is associated with the first reference signal includes that a measurement on the first reference signal is used to determine a spatial domain transmission filter corresponding to a radio signal transmitted on the first radio resource.

In one embodiment, the phrase that the first radio resource is associated with the first reference signal includes that a measurement on the first reference signal is used to determine a spatial domain transmission filter corresponding to a DMRS transmitted on the first radio resource.

In one embodiment, the phrase that the first radio resource is associated with the first reference signal includes that a spatial domain receive filter corresponding to the first reference signal is the same as a spatial domain transmission filter corresponding to a radio signal transmitted on the first radio resource.

In one embodiment, the phrase that the first radio resource is associated with the first reference signal includes that a spatial domain receive filter corresponding to the first reference signal is the same as a spatial domain transmission filter corresponding to a DMRS transmitted on the first radio resource.

In one embodiment, the phrase that the first radio resource is associated with the first reference signal includes that the UE in the present disclosure employs a same spatial domain transmission filter to transmit a radio signal on the first radio resource and receive the first reference signal.

In one embodiment, the phrase that the first radio resource is associated with the first reference signal includes that the UE in the present disclosure employs a same spatial domain transmission filter to transmit a DMRS on the first radio resource and receive the first reference signal.

In one embodiment, the phrase that the first radio resource is associated with the first reference signal includes that one antenna port for transmitting a radio signal that is transmitted on the first radio resource is quasi co-located with one antenna port for transmitting the first reference signal.

In one embodiment, the phrase that the first radio resource is associated with the first reference signal includes that one antenna port for transmitting a DMRS that is transmitted on the first radio resource is quasi co-located with one antenna port for transmitting the first reference signal.

In one embodiment, the phrase that the first radio resource is associated with the first reference signal includes that at least one antenna port for transmitting a DMRS that is transmitted on the first radio resource is quasi co-located with one antenna port for transmitting the first reference signal.

In one embodiment, the phrase that the first radio resource is associated with the first reference signal includes that any antenna port for transmitting a DMRS that is transmitted on the first radio resource is quasi co-located with one antenna port for transmitting the first reference signal.

In one embodiment, the phrase that the first radio resource is associated with the first reference signal includes that the UE in the present disclosure employs a same spatial domain transmission filter to transmit the first reference signal and transmit a radio signal on the first radio resource.

In one embodiment, the phrase that the first radio resource is associated with the first reference signal includes that the UE in the present disclosure employs a same spatial domain transmission filter to transmit the first reference signal and transmit a DMRS on the first radio resource.

Embodiment 10

Embodiment 10 illustrates a schematic diagram of a first radio resource being associated with a first reference signal; as shown in FIG. 10.

In Embodiment 10, the first radio resource is associated with the first reference signal.

In one embodiment, the phrase that the first radio resource is associated with the first reference signal includes that a measurement on the first reference signal is used to determine transmitting power of a radio signal transmitted on the first radio resource.

In one embodiment, the phrase that the first radio resource is associated with the first reference signal includes that a measurement on the first reference signal is used to determine a first pathloss, and a second reference power is linearly correlated to the first pathloss, the transmitting power of a radio signal transmitted on the first radio resource being a smaller value between the second reference power and a second power threshold.

In one subembodiment, a linear coefficient between the second reference power and the first pathloss is 1.

In one subembodiment, the second power threshold is $P_{CMAX,f,c}(i)$, and the specific definition of the $P_{CMAX,f,c}(i)$ can be found in TS38.213.

In one subembodiment, the first pathloss is equal to transmitting power of the first reference signal being subtracted by an RSRP of the first reference signal.

Embodiment 11

Figure 11:
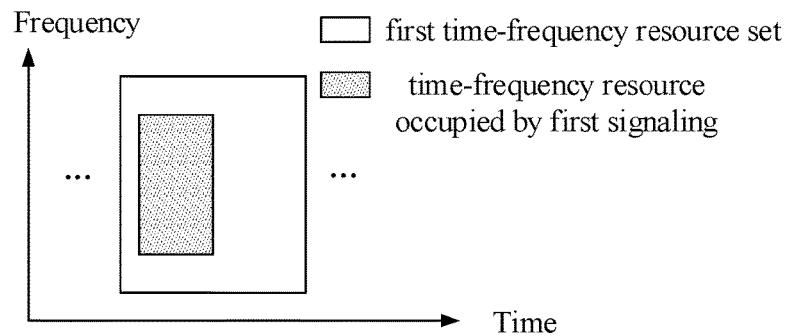
FIG. 11 illustrates a schematic diagram of a first time-frequency resource set according to one embodiment of the present disclosure.

Embodiment 11 illustrates a schematic diagram of a first time-frequency resource set; as shown in FIG. 11.

In Embodiment 11, a time-frequency resource occupied by the first signaling in the present disclosure belongs to the first time-frequency resource set, and the first time-frequency resource set is associated with the second reference signal in the present disclosure; the first radio resource in the present disclosure is related to the second reference signal. In FIG. 11, the rectangle filled with slashes represents the time-frequency resource occupied by the first signaling.

In one embodiment, the first time-frequency resource set is a COntrol REsource SET (CORESET).

In one embodiment, the first time-frequency resource set comprises a CORESET.

In one embodiment, the first time-frequency resource set is a search space.

In one embodiment, the first time-frequency resource set comprises a search space.

In one embodiment, the first time-frequency resource set is a search space set.

In one embodiment, the first time-frequency resource set comprises a search space set.

In one embodiment, the first time-frequency resource set occupies a positive integer number of RE(s) in time-frequency domain.

In one embodiment, the first time-frequency resource set occupies a positive integer number of multicarrier symbol(s) in time domain.

In one embodiment, the first time-frequency resource set occupies a positive integer number of consecutive multicarrier symbols in time domain.

In one embodiment, the first time-frequency resource set occupies a positive integer number of non-consecutive multicarrier symbols in time domain.

In one embodiment, the first time-frequency resource set occupies a positive integer number of subcarrier(s) in frequency domain.

In one embodiment, the first time-frequency resource set occupies a positive integer number of consecutive subcarriers in frequency domain.

In one embodiment, the first time-frequency resource set occurs multiple times in time domain.

In one embodiment, the first time-frequency resource set occurs only once in time domain.

In one embodiment, a time-frequency resource occupied by the first signaling is a PDCCH candidate.

In one embodiment, the second reference signal comprises an SS/PBCH block.

In one embodiment, the second reference signal comprises a CSI-RS.

In one embodiment, the phrase that the first time-frequency resource set is associated with a second reference signal includes that the second reference signal is used to determine a spatial relation of a radio signal transmitted on the first time-frequency resource set.

In one embodiment, the phrase that the first time-frequency resource set is associated with a second reference signal includes that the second reference signal is used to determine an antenna port for transmitting a radio signal that is transmitted on the first time-frequency resource set.

In one embodiment, the phrase that the first time-frequency resource set is associated with a second reference signal includes that the second reference signal is used to determine a spatial domain transmission filter corresponding to a radio signal transmitted on the first time-frequency resource set.

In one embodiment, the phrase that the first time-frequency resource set is associated with a second reference signal includes that the second reference signal is used to determine a spatial domain transmission filter corresponding to DMRS transmitted on the first time-frequency resource set.

In one embodiment, the phrase that the first time-frequency resource set is associated with a second reference signal includes that one antenna port for transmitting a radio signal that is transmitted on the first time-frequency resource set is quasi co-located with one antenna port for transmitting the second reference signal.

In one embodiment, the phrase that the first time-frequency resource set is associated with a second reference signal includes that one antenna port for transmitting a DMRS that is transmitted on the first time-frequency resource set is quasi co-located with one antenna port for transmitting the second reference signal.

In one embodiment, the phrase that the first time-frequency resource set is associated with a second reference signal includes that the UE employs a same spatial domain transmission filter to transmit the second reference signal and transmit a radio signal on the first time-frequency resource set.

In one embodiment, the phrase that the first time-frequency resource set is associated with a second reference signal includes that the UE employs a same spatial domain transmission filter to transmit the second reference signal and transmit DMRS on the first time-frequency resource set.

Embodiment 12

Figure 12:
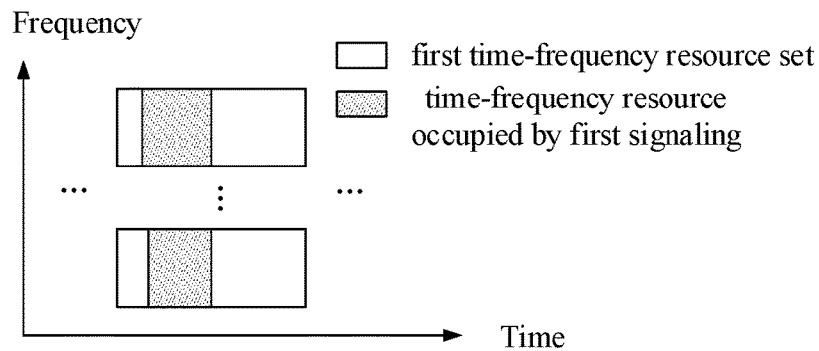
FIG. 12 illustrates a schematic diagram of a first time-frequency resource set according to one embodiment of the present disclosure.

Embodiment 12 illustrates a schematic diagram of a first time-frequency resource set; as shown in FIG. 12.

In Embodiment 12, the first time-frequency resource set occupies a positive integer number of non-consecutive subcarriers in frequency domain. A slash-filled box represents a time-frequency resource occupied by the first signaling.

Embodiment 13

Figure 13:
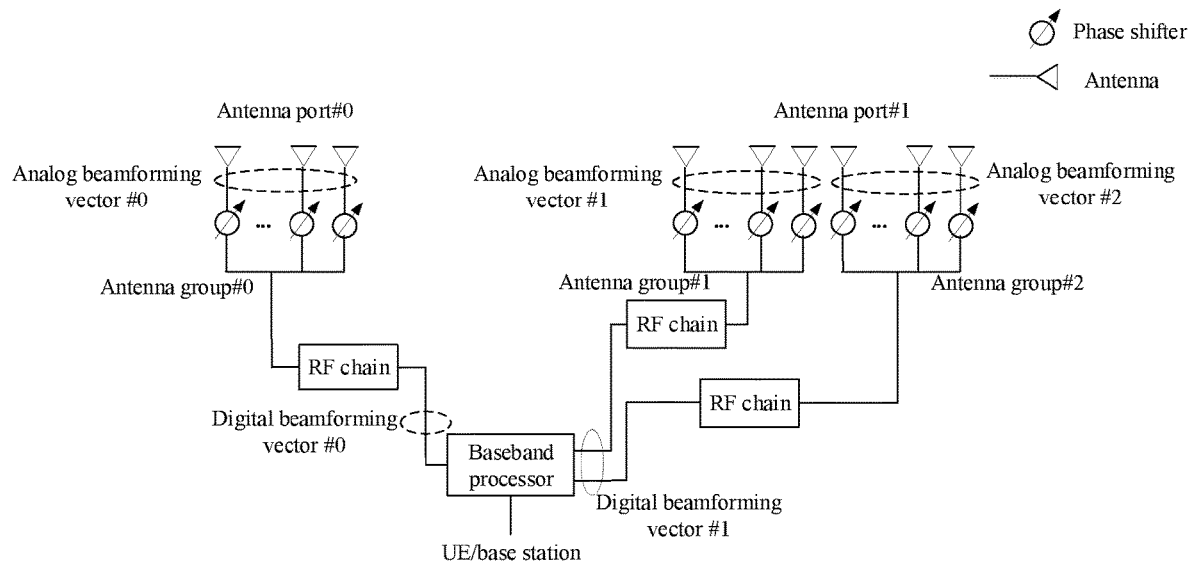
FIG. 13 illustrates a schematic diagram of an antenna port according to one embodiment of the present disclosure.

Embodiment 13 illustrates a schematic diagram of an antenna port; as shown in FIG. 13.

In Embodiment 13, a given antenna port is formed by superimposing antennas comprised by a positive integer number of antenna group(s) through antenna virtualization; each antenna group comprises a positive integer number of antenna(s). One antenna group is connected to a baseband processor via a Radio Frequency (RF) chain, so different antenna groups correspond to different RF chains. Mapping coefficients of all antennas in the positive integer number of antenna group(s) comprised in the given antenna port mapped to the given antenna port constitute a beamforming vector corresponding to the given antenna port. And mapping coefficients of multiple antennas comprised by any given antenna group of the positive integer number of antenna group(s) comprised in the given antenna port mapped to the given antenna port constitute an analog beamforming vector of the given antenna group. Analog beamforming vector(s) respectively corresponding to the positive integer number of antenna group(s) comprised in the given antenna port is(are) diagonally arranged to form an analog beamforming matrix corresponding to the given antenna port. Mapping coefficients of the positive integer number of antenna group(s) comprised in the given antenna port mapped to the given antenna port constitute a digital beamforming vector corresponding to the given antenna port. And the beamforming vector corresponding to the given antenna port is obtained as a product of the analog beamforming matrix and the digital beamforming vector corresponding to the given antenna port.

FIG. 13 illustrates two antenna ports, namely, an antenna port #0 and an antenna port #1. The antenna port #0 is composed of an antenna group #0, while the antenna port #1 is composed of an antenna group #1 and an antenna group #2. Mapping coefficients of multiple antennas in the antenna group #0 mapped to the antenna port #0 constitute an analog beamforming vector #0; and a mapping coefficient of the antenna group #0 to the antenna port #0 constitutes a digital beamforming vector #0; and a beamforming vector corresponding to the antenna port #0 is a product of the analog beamforming vector #0 and the digital beamforming vector #0. Mapping coefficients of multiple antennas in the antenna group #1 and mapping coefficients of multiple antennas in the antenna group #2 mapped to the antenna port #1 respectively constitute an analog beamforming vector #1 and an analog beamforming vector #2; mapping coefficients of the antenna group #1 and the antenna group #2 mapped to the antenna port #1 constitute a digital beamforming vector #1; and a beamforming vector corresponding to the antenna port #1 is obtained by multiplying the digital beamforming vector #1 by an analog beamforming matrix formed through diagonally arrangement of the analog beamforming vector #1 and the analog beamforming vector #2.

In one embodiment, for the specific meaning of the antenna port, refer to 3GPP TS38.211, section 4.4.

In one embodiment, small-scale channel parameters experienced by a radio signal transmitted from one antenna port can be inferred from small-scale channel parameters experienced by a radio signal transmitted from another antenna port.

In one embodiment, small-scale channel parameters experienced by a radio signal transmitted from one antenna port cannot be inferred from small-scale channel parameters experienced by a radio signal transmitted from another antenna port.

In one embodiment, the small-scale channel parameters include one or more of Channel Impulse Response (CIR), a Precoding Matrix Indicator (PMI), a Channel Quality Indicator (CQI) or a Rank Indicator (RI).

In one embodiment, an antenna port only comprises one antenna group, that is, an RF chain, which can be exemplified by the antenna port #0 in FIG. 13.

In one subembodiment, an analog beamforming matrix corresponding to the antenna port is dimensionally reduced to an analog beamforming vector, and a digital beamforming vector corresponding to the antenna port is dimensionally reduced to a scalar, so a beamforming vector corresponding to the antenna port is equivalent to an analog beamforming vector corresponding to the antenna port. For example, the antenna port #0 in FIG. 13 only comprises the antenna group #0, the digital beamforming vector #0 is dimensionally reduced to a scalar, and a beamforming vector corresponding to the antenna port #0 is the analog beamforming vector #0.

In one embodiment, an antenna port comprises multiple antenna groups, that is, multiple RF chains, which can be exemplified by the antenna port #1 in FIG. 13.

Embodiment 14

Figure 14:
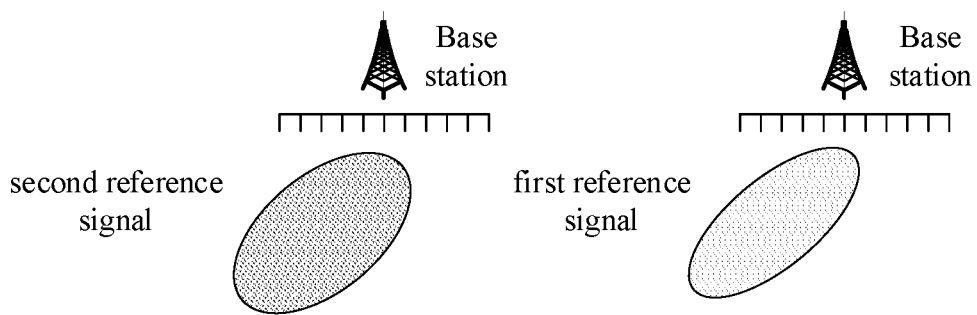
FIG. 14 illustrates a schematic diagram of one antenna port for transmitting a first reference signal being QCL with one antenna port for transmitting a second reference signal according to one embodiment of the present disclosure.

Embodiment 14 illustrates a schematic diagram of one antenna port for transmitting a first reference signal being QCL with one antenna port for transmitting a second reference signal; as shown in FIG. 14.

In Embodiment 14, one antenna port for transmitting the first reference signal is quasi co-located with one antenna port for transmitting the second reference signal. As illustrated in FIG. 14, the cross-filled ellipse represents the second reference signal, and the dot-filled ellipse represents the first reference signal.

In one embodiment, the specific definition of the phrase of quasi co-located can be found in 3GPP TS38.211, section 4.4.

In one embodiment, two antenna ports being quasi co-located means that large-scale properties of a channel that a radio signal transmitted from one of the two antenna ports goes through can be used to infer large-scale properties of a channel that a radio signal transmitted from the other of the two antenna ports goes through.

In one embodiment, the large-scale properties include one or more of delay spread, Doppler spread, Doppler shift, average gain, average delay or Spatial Rx parameters.

In one embodiment, Spatial Rx parameters include one or more of a receiving beam, a reception analog beamforming matrix, a reception analog beamforming vector, a reception digital beamforming vector, a reception beamforming vector or a Spatial Domain Receive Filter.

In one embodiment, any antenna port for transmitting the first reference signal is quasi co-located with one antenna port for transmitting the second reference signal.

In one embodiment, at least one antenna port for transmitting the first reference signal is quasi co-located with one antenna port for transmitting the second reference signal.

In one embodiment, large-scale properties of a channel that the second reference signal goes through can be inferred from large-scale properties of a channel that the first reference signal goes through.

In one embodiment, the first reference signal is the second reference signal.

In one embodiment, small-scale channel parameters experienced by the second reference signal can be inferred from small-scale channel parameters experienced by the first reference signal.

In one embodiment, small-scale channel parameters experienced by the second reference signal cannot be inferred from small-scale channel parameters experienced by the first reference signal.

Embodiment 15

Figure 15:
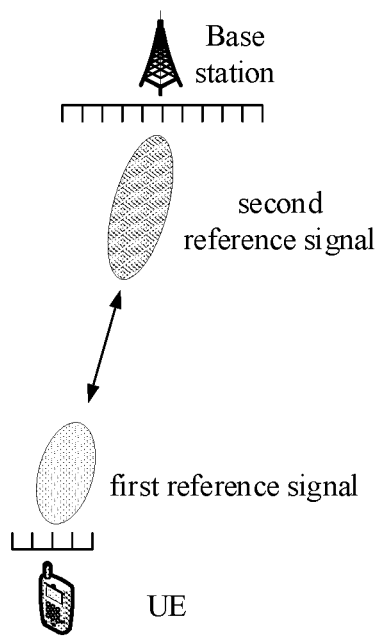
FIG. 15 illustrates a schematic diagram of a measurement on a second reference signal being used to determine an antenna port for transmitting a first reference signal according to one embodiment of the present disclosure.

Embodiment 15 illustrates a schematic diagram of a measurement on a second reference signal being used to determine an antenna port for transmitting a first reference signal; as shown in FIG. 15.

In Embodiment 15, the measurement on the second reference signal is used for determining an antenna port for transmitting the first reference signal. In FIG. 15, the cross-filled ellipse represents the second reference signal, and the dot-filled ellipse represents the first reference signal.

In one embodiment, the measurement on the second reference signal is used for determining a spatial domain transmission filter corresponding to the first reference signal.

In one embodiment, the measurement on the second reference signal is used for determining a precoder corresponding to the first reference signal.

In one embodiment, a spatial domain receive filter corresponding to the second reference signal is the same as a spatial domain transmission filter of the first reference signal.

In one embodiment, the UE in the present disclosure transmits the first reference signal and receives the second reference signal employing a same spatial domain transmission filter.

Embodiment 16

Figure 16:
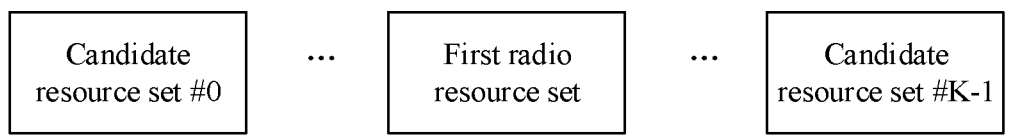
FIG. 16 illustrates a schematic diagram of a first radio resource set and K candidate resource sets according to one embodiment of the present disclosure.

Embodiment 16 illustrates a schematic diagram of a first radio resource set and K candidate resource sets; as shown in FIG. 16.

In Embodiment 16, the first radio resource in the present disclosure is a radio resource in the first radio resource set; the first radio resource set is one of the K candidate resource sets, K being a positive integer greater than 1, and any of the K candidate resource sets comprises a positive integer number of radio resource(s). In FIG. 16, indexes of the K candidate resource sets are #0 . . . , and #K−1, respectively.

In one embodiment, the first radio resource set comprises a positive integer number of radio resource(s).

In one embodiment, the first radio resource set comprises a positive integer number of PUCCH resource(s).

In one embodiment, the first radio resource set comprises a positive integer number of PUCCH resource set(s).

In one embodiment, the first radio resource set is a PUCCH resource set.

In one embodiment, any radio resource comprised in the K candidate resource sets comprises at least the former of a time-frequency resource and a code-domain resource.

In one embodiment, any of the K candidate resource sets comprises a positive integer number of PUCCH resource(s).

In one embodiment, any of the K candidate resource sets comprises a positive integer number of PUCCH resource set(s).

In one embodiment, any of the K candidate resource sets is a PUCCH resource set.

In one embodiment, any radio resource comprised in the K candidate resource sets comprises a PUCCH resource.

In one embodiment, any radio resource comprised in the K candidate resource sets is a PUCCH resource.

In one embodiment, any radio resource comprised in the K candidate resource sets comprises a PUCCH resource set.

In one embodiment, any radio resource comprised in the K candidate resource sets is a PUCCH resource set.

In one embodiment, a frequency-domain resource occupied by any radio resource in the first radio resource set and a frequency-domain resource occupied by the first radio signal in the present disclosure belong to a same BWP.

In one embodiment, a frequency-domain resource occupied by any radio resource in the first radio resource set and a frequency-domain resource occupied by the first radio signal in the present disclosure belong to a same uplink BWP.

In one embodiment, a frequency-domain resource occupied by any radio resource in the first radio resource set and a frequency-domain resource occupied by the first radio signal in the present disclosure belong to a same uplink BWP on a same serving cell.

In one embodiment, a frequency-domain resource occupied by any radio resource comprised in the K candidate resource sets and a frequency-domain resource occupied by the first radio signal in the present disclosure belong to a same BWP.

In one embodiment, a frequency-domain resource occupied by any radio resource comprised in the K candidate resource sets and a frequency-domain resource occupied by the first radio signal in the present disclosure belong to a same uplink BWP.

In one embodiment, a frequency-domain resource occupied by any radio resource comprised in the K candidate resource sets and a frequency-domain resource occupied by the first radio signal in the present disclosure belong to a same uplink BWP on a same serving cell.

In one embodiment, K is equal to 2.

In one embodiment, K is greater than 2.

In one embodiment, any radio resource in the first radio resource set is associated with the first reference signal.

In one embodiment, at least one radio resource in the first radio resource set is not associated with the first reference signal.

In one embodiment, any radio resource in the first radio resource set is associated with a reference signal.

In one subembodiment, the reference signal comprises an SS/PBCH block.

In one subembodiment, the reference signal comprises a CSI-RS.

In one subembodiment, the reference signal comprises an SRS.

In one embodiment, all radio resources in the first radio resource set are associated with a same reference signal.

In one embodiment, at least two radio resources in the first radio resource set are respectively associated with different reference signals.

In one embodiment, any radio resource comprised in the K candidate resource sets is associated with a reference signal.

In one subembodiment, the reference signal comprises an SS/PBCH block.

In one subembodiment, the reference signal comprises a CSI-RS.

In one subembodiment, the reference signal comprises an SRS.

In one embodiment, the second reference signal in the present disclosure is used to determine the first radio resource set out of the K candidate resource sets.

In one embodiment, the first time-frequency resource set in the present disclosure is used to determine the first radio resource set out of the K candidate resource sets.

Embodiment 17

Figure 17:
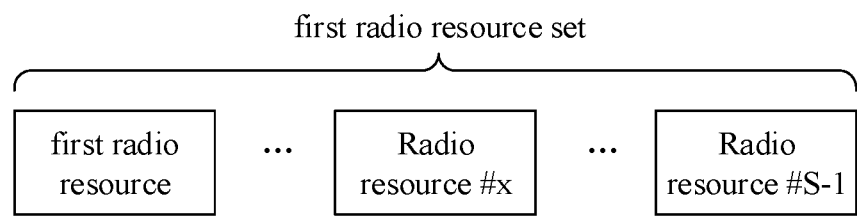
FIG. 17 illustrates a schematic diagram of a position of a first radio resource in a first radio resource set according to one embodiment of the present disclosure.

Embodiment 17 illustrates a schematic diagram of a position of a first radio resource in a first radio resource set; as shown in FIG. 17.

In Embodiment 17, the first radio resource set comprises S radio resource(s), S being a positive integer. An index of the first radio resource is a smallest value of index(es) of the S radio resource(s). In FIG. 17, the index(es) of the S radio resource(s) is(are) #0, . . . #x . . . , and #S-1, respectively. Herein, x is a positive integer less than S-1.

In one embodiment, the first radio resource set comprises multiple radio resources.

In one embodiment, the first radio resource set only comprises one radio resource.

In one embodiment, the first radio resource is one of the S radio resource(s).

In one embodiment, a position of the first radio resource in the first radio resource set needs no configuration.

In one embodiment, an index of the first radio resource is a smallest value among indexes of all radio resources comprised by the first radio resource set.

In one embodiment, an index of the first radio resource is a PUCCH resource index.

In one embodiment, an index of the first radio resource is a PUCCH resource ID.

In one embodiment, an index of the first radio resource is configured by a higher-layer parameter pucch-ResourceId.

In one embodiment, an index of any radio resource in the first radio resource set is a PUCCH resource index.

In one embodiment, an index of any radio resource in the first radio resource set is a PUCCH resource ID.

In one embodiment, an index of any radio resource in the first radio resource set is configured by a higher layer parameter pucch-ResourceId.

In one embodiment, the detailed definition of the pucch-ResourceId can be found in 3GPP TS38.331.

Embodiment 18

Figure 18:
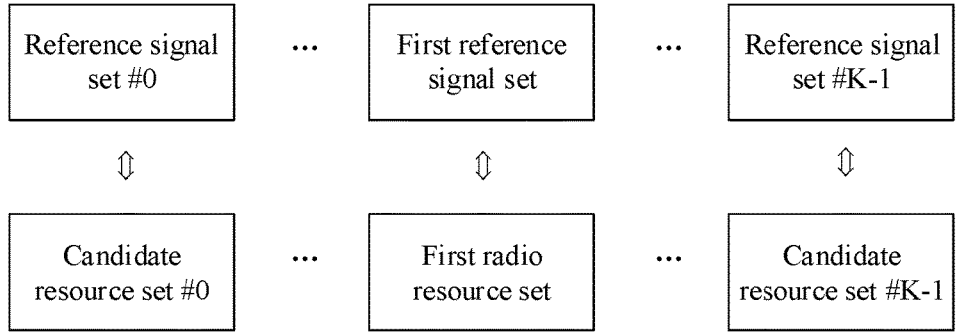
FIG. 18 illustrates a schematic diagram of K reference signal sets respectively corresponding to K candidate resource sets according to one embodiment of the present disclosure.

Embodiment 18 illustrates a schematic diagram of K reference signal sets respectively corresponding to K candidate resource sets; as shown in FIG. 18.

In Embodiment 18, the first information in the present disclosure is used to determine the K reference signal sets, and the K reference signal sets respectively correspond to the K candidate resource sets. A first reference signal set is one of the K reference signal sets that corresponds to the first radio resource set in the present disclosure; a target radio resource is any radio resource comprised in the first radio resource set, and the target radio resource is associated with a target reference signal. In FIG. 18, indexes of the K reference signal sets and the K candidate resource sets are #0 . . . , and #K−1, respectively.

In one embodiment, the first information is carried by a higher layer signaling.

In one embodiment, the first information is carried by an RRC signaling.

In one embodiment, the first information is carried by a Medium Access Control layer Control Element (MAC CE) signaling.

In one embodiment, the first information is carried by a physical layer signaling.

In one embodiment, the first information indicates the K reference signal sets.

In one embodiment, the first information explicitly indicates the K reference signal sets.

In one embodiment, the first information implicitly indicates the K reference signal sets.

In one embodiment, a transmitter of the first information is a transmitter of the first signaling in the present disclosure.

In one embodiment, a transmitter of the first information is not a transmitter of the first signaling in the present disclosure.

In one embodiment, any one of the K reference signal sets comprises a positive integer number of reference signal(s).

In one embodiment, any one of the K reference signal sets comprises a positive integer number of downlink reference signal(s).

In one embodiment, the K reference signal sets comprise an SS/PBCH block.

In one embodiment, the K reference signal sets comprise a CSI-RS.

In one embodiment, at least one of the K reference signal sets comprises multiple reference signals.

In one embodiment, at least one of the K reference signal sets comprises only one reference signal.

In one embodiment, antenna ports for transmitting any two reference signals comprised in the K reference signal sets cannot be assumed to be QCL.

In one embodiment, the target reference signal comprises an SS/PBCH block.

In one embodiment, the target reference signal comprises a CSI-RS.

In one embodiment, the target reference signal comprises an SRS.

In one embodiment, the target reference signal is the first reference signal in the present disclosure.

In one embodiment, the target reference signal is not the first reference signal in the present disclosure.

In one embodiment, one antenna port for transmitting the target reference signal is quasi co-located with one antenna port for transmitting a reference signal in the first reference signal set.

In one embodiment, the UE in the present disclosure employs a same spatial domain receive filter to receive a reference signal comprised in the first reference signal set and receive the target reference signal.

In one embodiment, the target reference signal is a reference signal in the first reference signal set.

In one embodiment, a measurement on a reference signal in the first reference signal set is used to determine one or more antenna ports for transmitting the target reference signal.

In one embodiment, the UE in the present disclosure employs a same spatial domain transmission filter to transmit the target reference signal and receive a reference signal comprised in the first reference signal set.

In one embodiment, the phrase that the target radio resource is associated with a target reference signal includes that the UE in the present disclosure employs a same spatial domain transmission filter to transmit a radio resource on the target radio resource and receive the target reference signal.

In one embodiment, the phrase that the target radio resource is associated with a target reference signal includes that one antenna port for transmitting a radio signal transmitted on the target radio resource is quasi co-located with one antenna port for transmitting the target reference signal.

In one embodiment, the phrase that the target radio resource is associated with a target reference signal includes that the UE in the present disclosure employs a same spatial domain transmission filter to transmit the target reference signal and transmit a radio resource on the target radio resource.

In one embodiment, the phrase that the target radio resource is associated with a target reference signal includes that a measurement on the target reference signal is used to determine transmitting power of a radio signal transmitted on the target radio resource.

In one embodiment, the phrase that the target radio resource is associated with a target reference signal includes that a measurement on the target reference signal is used to determine a second pathloss, and the transmitting power of a radio signal transmitted on the target radio resource is linearly correlated to the second pathloss.

In one embodiment, a given reference signal set is any one of the K reference signal sets, and the given reference signal set corresponds to a given candidate resource set of the K candidate resource sets. For any given radio resource in the given candidate resource set, the given radio resource is associated with a given reference signal. One antenna port for transmitting the given reference signal and one antenna port for transmitting a reference signal comprised in the given reference signal set are QCL, or, a measurement on a reference signal comprised in the given reference signal set is used to determine an antenna port of the given reference signal.

In one subembodiment, the phrase that the given radio resource is associated with a given reference signal includes that the UE in the present disclosure employs a same spatial domain transmission filter to transmit a radio signal on the given radio resource and receive the given reference signal.

In one subembodiment, the phrase that the given radio resource is associated with a given reference signal includes that the UE in the present disclosure employs a same spatial domain transmission filter to transmit the given reference signal and transmit a radio signal on the given radio resource.

In one subembodiment, the phrase that the given radio resource is associated with a given reference signal includes that a measurement on the given reference signal is used to determine transmitting power of a radio signal transmitted on the given radio resource.

In one embodiment, the second reference signal in the present disclosure is a reference signal in the first reference signal set.

In one embodiment, one antenna port for transmitting the second reference signal in the present disclosure is quasi co-located with one antenna port for transmitting a reference signal comprised in the first reference signal set.

In one embodiment, the first reference signal in the present disclosure is a reference signal in the first reference signal set.

Embodiment 19

Figure 19:
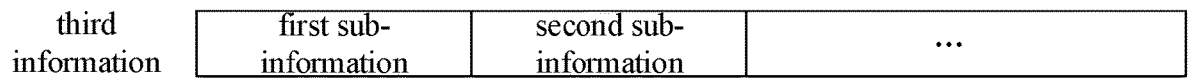
FIG. 19 illustrates a schematic diagram of second information comprising configuration information of a first reference signal according to one embodiment of the present disclosure.

Embodiment 19 illustrates a schematic diagram of second information comprising configuration information of a first reference signal; as shown in FIG. 19.

In Embodiment 19, the second information comprises configuration information of the first reference signal.

In one embodiment, the second information is carried by a higher layer signaling.

In one embodiment, the second information is carried by an RRC signaling.

In one embodiment, the second information is an Information Element (IE).

In one embodiment, the second information is part of or all information contained in an IE.

In one embodiment, the second information comprises part of or all information contained in an SRS-Config IE.

In one embodiment, the second information is an SRS-Config IE.

In one embodiment, the detailed definition of the SRS-Config IE can be found in 3GPP TS38.331.

In one embodiment, the second information comprises part of or all information contained in an NZP-CSI-RS-Resource IE.

In one embodiment, the second information is an NZP-CSI-RS-Resource IE.

In one embodiment, the detailed definition of the NZP-CSI-RS-Resource IE can be found in 3GPP TS38.331.

In one embodiment, a transmitter of the second information is a transmitter of the first signaling in the present disclosure.

In one embodiment, a transmitter of the second information is not a transmitter of the first signaling in the present disclosure.

In one embodiment, configuration information of the first reference signal comprises one or more of an occupied time-domain resource, an occupied frequency-domain resource, an occupied code-domain resource, an RS sequence, a transmission antenna port, a Spatial Rx parameter, a Quasi Co-Location (QCL) source or a QCL type.

In one embodiment, the second information indicates an index of the first reference signal.

In one embodiment, an index of the first reference signal is an SRS-ResourceId, for the specific definition of the SRS-ResourceId, refer to 3GPP TS38.331.

In one embodiment, an index of the first reference signal is an NZP-CSI-RS-ResourceId, for the specific definition of the NZP-CSI-RS-ResourceId, refer to 3GPP TS38.331.

In one embodiment, an index of the first reference signal is an SSB-Index, for the specific definition of the SSB-Index, refer to 3GPP TS38.331.

In one embodiment, the operating in the present disclosure refers to receiving, and the executing in the present disclosure refers to transmitting.

In one subembodiment, the first reference signal comprises an SS/PBCH block.

In one subembodiment, the first reference signal comprises a CSI-RS.

In one embodiment, the operating in the present disclosure refers to transmitting, and the executing in the present disclosure refers to receiving.

In one subembodiment, the first reference signal comprises an SRS.

Embodiment 20

Figure 20:
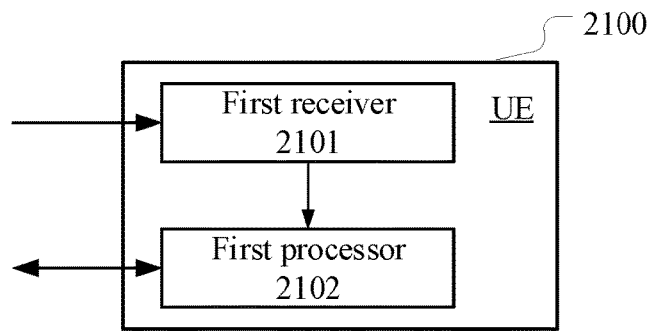
FIG. 20 illustrates a schematic diagram of content in third information according to one embodiment of the present disclosure.

Embodiment 20 illustrates a schematic diagram of content in third information; as shown in FIG. 20.

In one embodiment, the third information indicates the first radio resource in the present disclosure. The third information comprises first sub-information and second sub-information; the first sub-information indicates that the first reference signal in the present disclosure is associated with the first radio resource, while the second sub-information indicates an index of the first radio resource.

In one embodiment, the third information is carried by a higher layer signaling.

In one embodiment, the third information is carried by an RRC signaling.

In one embodiment, the third information comprises part of or all information in a PUCCH-Config IE.

In one embodiment, the third information is a PUCCH-Config IE.

In one embodiment, the third information comprises part of or all information in a PUCCH-ResourceSet.

In one embodiment, the third information is a PUCCH-ResourceSet.

In one embodiment, the third information comprises part of or all information in a PUCCH-Resource.

In one embodiment, the third information is a PUCCH-Resource.

In one embodiment, the third information comprises part of or all information in a PUCCH-SpatialRelationInfo IE.

In one embodiment, the detailed definition of the PUCCH-Config IE can be found in 3GPP TS38.331.

In one embodiment, the detailed definition of the PUCCH-ResourceSet can be found in 3GPP TS38.331.

In one embodiment, the detailed definition of the PUCCH-Resource can be found in 3GPP TS38.331.

In one embodiment, the detailed definition of the PUCCH-SpatialRelationInfo IE can be found in 3GPP TS38.331.

In one embodiment, a transmitter of the third information is a transmitter of the first signaling in the present disclosure.

In one embodiment, a transmitter of the third information is not a transmitter of the first signaling in the present disclosure.

In one embodiment, the third information indicates at least the former of a time-frequency resource and a code-domain resource occupied by the first radio resource.

In one embodiment, the third information indicates configuration information of the first radio resource; and the configuration information of the first radio resource comprises one or more of an occupied time-domain resource, an occupied frequency-domain resource, an occupied code-domain resource, an RS sequence, a PUCCH format, an OCC length, an OCC index, a transmission antenna port, a spatial relation, or a spatial domain transmission filter.

In one embodiment, the third information indicates an index of the first reference signal.

In one embodiment, the third information indicates that the first reference signal is associated with the first radio resource.

In one embodiment, the third information comprises first sub-information, the first sub-information indicating that the first reference signal is associated with the first radio resource.

In one subembodiment, the first sub-information indicates an index of the first reference signal.

In one subembodiment, the first sub-information comprises part of or all information contained in a spatialRelationInfoToAddModList field of a PUCCH-Config IE.

In one subembodiment, the first sub-information comprises part of or all information contained in a referenceSignal field of a PUCCH-SpatialRelationInfo IE.

In one subembodiment, the first sub-information comprises part of or all information contained in a pucch-PathlossReferenceRS-Id field of a PUCCH-SpatialRelationInfo IE.

In one embodiment, the detailed definition of the spatialRelationInfoToAddModList field can be found in 3GPP TS38.331.

In one embodiment, the detailed definition of the referenceSignal field can be found in 3GPP TS38.331.

In one embodiment, the detailed definition of the pucch-PathlossReferenceRS-Id field can be found in 3GPP TS38.331.

In one embodiment, the third information indicates an index of the first radio resource.

In one embodiment, the third information comprises second sub-information, the second sub-information indicating an index of the first radio resource.

In one subembodiment, the second sub-information comprises part of or all information contained in a resourceToAddModList field of a PUCCH-Config IE.

In one subembodiment, the second sub-information comprises part of or all information contained in a resourceSetToAddModList field of a PUCCH-Config IE.

In one subembodiment, the second sub-information comprises part of or all information contained in a pucch-ResourceSetId field of a PUCCH-ResourceSet.

In one subembodiment, the second sub-information comprises part of or all information contained in a pucch-ResourceId field of a PUCCH-Resource.

In one embodiment, the detailed definition of the resourceToAddModList field can be found in 3GPP TS38.331.

In one embodiment, the detailed definition of the resourceSetToAddModList field can be found in 3GPP TS38.331.

In one embodiment, the detailed definition of the pucch-ResourceSetId field can be found in 3GPP TS38.331.

In one embodiment, the detailed definition of the pucch-ResourceId field can be found in 3GPP TS38.331.

In one embodiment, the third information indicates the first radio resource set in the present disclosure.

In one embodiment, the third information indicates the K candidate resource sets in the present disclosure.

Embodiment 21

Figure 21:
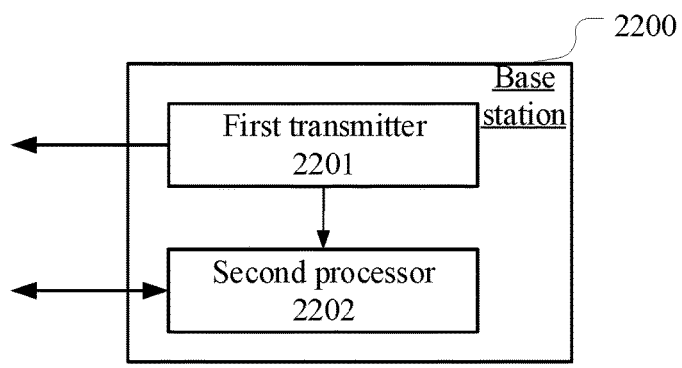
FIG. 21 illustrates a structure block diagram of a processing device in a UE according to one embodiment of the present disclosure.

Embodiment 21 illustrates a structure block diagram of a processing device in a UE; as shown in FIG. 21. In FIG. 21, a processing device 2100 in a UE is mainly composed of a first receiver 2101 and a first processor 2102.

In Embodiment 21, the first receiver 2101 receives a first signaling; and the first processor 2102 transmits a first radio signal.

In Embodiment 21, the first signaling comprises scheduling information of the first radio signal; a first reference signal is used to determine at least one of transmitting power of the first radio signal or one or more antenna ports for transmitting the first radio signal; a first radio resource is associated with the first reference signal, and the first radio resource is related to the first signaling; the first signaling does not comprise a first field, the first field indicating one or more antenna ports for transmitting a radio signal scheduled by a signaling to which the first field belongs.

In one embodiment, a time-frequency resource occupied by the first signaling belongs to a first time-frequency resource set, and the first time-frequency resource set is associated with a second reference signal; the first radio resource is related to the second reference signal.

In one embodiment, one antenna port for transmitting the first reference signal is quasi co-located with one antenna port for transmitting the second reference signal.

In one embodiment, the measurement on the second reference signal is used for determining an antenna port for transmitting the first reference signal.

In one embodiment, the first radio resource is a radio resource in a first radio resource set; the first radio resource set is a candidate resource set of K candidate resource sets, K being a positive integer greater than 1, and any of the K candidate resource sets comprising at least one radio resource; the first signaling is used to determine the first radio resource set out of the K candidate resource sets.

In one embodiment, the first radio resource is in a fixed position in the first radio resource set.

In one embodiment, the first receiver 2101 receives first information; herein, the first information is used to determine K reference signal sets, the K reference signal sets respectively correspond to the K candidate resource sets, and a first reference signal set is one of the K reference signal sets that corresponds to the first radio resource set; a target radio resource is any radio resource in the first radio resource set, and the target radio resource is associated with a target reference signal; one antenna port for transmitting the target reference signal is QCL with one antenna port for transmitting a reference signal in the first reference signal set, or, a measurement on a reference signal in the first reference signal set is used to determine one or more antenna ports for transmitting the target reference signal.

In one embodiment, the first receiver 2101 receives second information; herein, the second information comprises configuration information of the first reference signal.

In one embodiment, the first processor 2102 operates the first reference signal; herein, the operating is receiving, or, the operating is transmitting.

In one embodiment, the first receiver 2101 receives third information; herein, the third information indicates the first radio resource.

In one embodiment, the first receiver 2101 comprises at least one of the antenna 452, the receiver 454, the receiving processor 456, the multi-antenna receiving processor 458, the controller/processor 459, the memory 460 or the data source 467 in Embodiment 4.

In one embodiment, the first processor 2102 comprises at least one of the antenna 452, the transmitter/receiver 454, the transmitting processor 468, the receiving processor 456, the multi-antenna transmitting processor 457, the multi-antenna receiving processor 458, the controller/processor 459, the memory 460 or the data source 467 in Embodiment 4.

Embodiment 22

Figure 22:
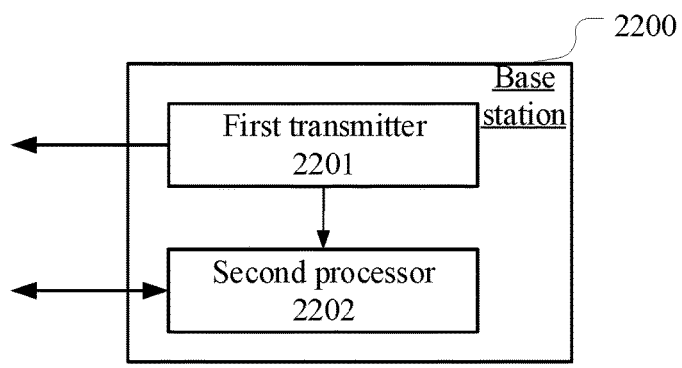
FIG. 22 illustrates a structure block diagram of a processing device in a base station according to one embodiment of the present disclosure.

Embodiment 22 illustrates a structure block diagram of a processing device in a base station; as shown in FIG. 22. In FIG. 22, a processing device 2200 in a base station is mainly composed of a first transmitter 2201 and a second processor 2202.

In Embodiment 22, the first transmitter 2201 transmits a first signaling; and the second processor 2202 receives a first radio signal.

In Embodiment 22, the first signaling comprises scheduling information of the first radio signal; a first reference signal is used to determine at least one of transmitting power of the first radio signal or one or more antenna ports for transmitting the first radio signal; a first radio resource is associated with the first reference signal, and the first radio resource is related to the first signaling; the first signaling does not comprise a first field, the first field indicating one or more antenna ports for transmitting a radio signal scheduled by a signaling to which the first field belongs.

In one embodiment, a time-frequency resource occupied by the first signaling belongs to a first time-frequency resource set, and the first time-frequency resource set is associated with a second reference signal; the first radio resource is related to the second reference signal.

In one embodiment, one antenna port for transmitting the first reference signal is quasi co-located with one antenna port for transmitting the second reference signal.

In one embodiment, the measurement on the second reference signal is used for determining an antenna port for transmitting the first reference signal.

In one embodiment, the first radio resource is a radio resource in a first radio resource set; the first radio resource set is a candidate resource set of K candidate resource sets, K being a positive integer greater than 1, and any of the K candidate resource sets comprising at least one radio resource; the first signaling is used to determine the first radio resource set out of the K candidate resource sets.

In one embodiment, the first radio resource is in a fixed position in the first radio resource set.

In one embodiment, the first transmitter 2201 transmits first information; herein, the first information is used to determine K reference signal sets, the K reference signal sets respectively correspond to the K candidate resource sets, and a first reference signal set is one of the K reference signal sets that corresponds to the first radio resource set; a target radio resource is any radio resource in the first radio resource set, and the target radio resource is associated with a target reference signal; one antenna port for transmitting the target reference signal is QCL with one antenna port for transmitting a reference signal in the first reference signal set, or, a measurement on a reference signal in the first reference signal set is used to determine one or more antenna ports for transmitting the target reference signal.

In one embodiment, the first transmitter 2201 transmits second information; herein, the second information comprises configuration information of the first reference signal.

In one embodiment, the second processor 2202 executes the first reference signal; herein, the executing is transmitting, or, the executing is receiving.

In one embodiment, the first transmitter 2201 transmits third information; herein, the third information indicates the first radio resource.

In one embodiment, the first transmitter 2201 comprises at least one of the antenna 420, the transmitter 418, the transmitting processor 416, the multi-antenna transmitting processor 471, the controller/processor 475 or the memory 476 in Embodiment 4.

In one embodiment, the second processor 2202 comprises at least one of the antenna 420, the transmitter/receiver 418, the transmitting processor 416, the receiving processor 470, the multi-antenna transmitting processor 471, the multi-antenna receiving processor 472, the controller/processor 475 or the memory 476 in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communications, comprising:
   receiving a first signaling, the first signaling comprises downlink control information (DCI); and
   transmitting a first radio signal, the first radio signal is transmitted on a physical uplink shared channel (PUSCH);
   wherein the first signaling comprises scheduling information of the first radio signal;
   a first reference signal is used to determine at least one of transmitting power of the first radio signal or one or more antenna ports for transmitting the first radio signal;
   wherein determination of an antenna port for transmitting the first radio signal comprises: using the first reference signal to determine a spatial domain transmission filter corresponding to the first radio signal;
   a first radio resource is associated with the first reference signal, the first radio resource is a physical uplink control channel (PUCCH) resource, and the first radio resource is related to the first signaling;
   the first signaling does not comprise a first field, and the first field is a sounding reference signal (SRS) resource indicator field, the first field indicating one or more antenna ports for transmitting a radio signal scheduled by a signaling to which the first field belongs; and
   the first radio resource is related to the first signaling by using a time-frequency resource occupied by the first signaling to determine the first radio resource.

2. The method according to claim 1, wherein the time-frequency resource occupied by the first signaling belongs to a first time-frequency resource set, and the first time-frequency resource set is associated with a second reference signal; the first radio resource is related to the second reference signal;
   or, the time-frequency resource occupied by the first signaling belongs to a first time-frequency resource set, and the first time-frequency resource set is associated with a second reference signal; the first radio resource is related to the second reference signal; one antenna port for transmitting the first reference signal is Quasi-Co-Located (QCL) with one antenna port for transmitting the second reference signal, or, a measurement on the second reference signal is used to determine one or more antenna ports for transmitting the first reference signal.

3. The method according to claim 1, wherein the first radio resource is a radio resource in a first radio resource set; the first radio resource set is a candidate resource set of K candidate resource sets, K being a positive integer greater than 1, and any of the K candidate resource sets comprising at least one radio resource; the first signaling is used to determine the first radio resource set out of the K candidate resource sets; or, comprising:
   receiving first information;
   wherein the first radio resource is a radio resource in a first radio resource set; the first radio resource set is a candidate resource set of K candidate resource sets, K being a positive integer greater than 1, and any of the K candidate resource sets comprising at least one radio resource; the first signaling is used to determine the first radio resource set out of the K candidate resource sets; the first information is used to determine K reference signal sets, the K reference signal sets respectively correspond to the K candidate resource sets, and a first reference signal set is one of the K reference signal sets that corresponds to the first radio resource set; a target radio resource is any radio resource in the first radio resource set, and the target radio resource is associated with a target reference signal; one antenna port for transmitting the target reference signal is QCL with one antenna port for transmitting a reference signal in the first reference signal set, or, a measurement on a reference signal in the first reference signal set is used to determine one or more antenna ports for transmitting the target reference signal.

4. The method according to claim 3, wherein the first radio resource is in a fixed position in the first radio resource set; or, an index of the first radio resource is a minimum value of indexes of all radio resources comprised in the first radio resource set.

5. The method according to claim 1, comprising at least one of:
   receiving second information;
   operating the first reference signal; or
   receiving third information;
   wherein the second information comprises configuration information of the first reference signal; the operating is receiving, or, the operating is transmitting; the third information indicates the first radio resource.

6. A method in a base station for wireless communications, comprising:
   transmitting a first signaling, the first signaling comprises DCI; and
   receiving a first radio signal, the first radio signal is transmitted on a PUSCH;
   wherein the first signaling comprises scheduling information of the first radio signal;
   a first reference signal is used to determine at least one of transmitting power of the first radio signal or one or more antenna ports for transmitting the first radio signal;
   determination of an antenna port for transmitting the first radio signal comprises: using the first reference signal to determine a spatial domain transmission filter corresponding to the first radio signal;
   a first radio resource is associated with the first reference signal, the first radio resource is a PUCCH resource, and the first radio resource is related to the first signaling;
   the first signaling does not comprise a first field, and the first field is an SRS resource indicator field, the first field indicating one or more antenna ports for transmitting a radio signal scheduled by a signaling to which the first field belongs;
   the first radio resource is related to the first signaling by using a time-frequency resource occupied by the first signaling to determine the first radio resource.

7. The method according to claim 6, wherein the time-frequency resource occupied by the first signaling belongs to a first time-frequency resource set, and the first time-frequency resource set is associated with a second reference signal; the first radio resource is related to the second reference signal;
or, the time-frequency resource occupied by the first signaling belongs to a first time-frequency resource set, and the first time-frequency resource set is associated with a second reference signal; the first radio resource is related to the second reference signal; one antenna port for transmitting the first reference signal is QCL with one antenna port for transmitting the second reference signal, or, a measurement on the second reference signal is used to determine one or more antenna ports for transmitting the first reference signal.

8. The method according to claim 6, wherein the first radio resource is a radio resource in a first radio resource set; the first radio resource set is a candidate resource set of K candidate resource sets, K being a positive integer greater than 1, and any of the K candidate resource sets comprising at least one radio resource; the first signaling is used to determine the first radio resource set out of the K candidate resource sets;
or, comprising:
transmitting first information;
wherein the first radio resource is a radio resource in a first radio resource set; the first radio resource set is a candidate resource set of K candidate resource sets, K being a positive integer greater than 1, and any of the K candidate resource sets comprising at least one radio resource; the first signaling is used to determine the first radio resource set out of the K candidate resource sets; the first information is used to determine K reference signal sets, the K reference signal sets respectively correspond to the K candidate resource sets, and a first reference signal set is one of the K reference signal sets that corresponds to the first radio resource set; a target radio resource is any radio resource in the first radio resource set, and the target radio resource is associated with a target reference signal; one antenna port for transmitting the target reference signal is QCL with one antenna port for transmitting a reference signal in the first reference signal set, or, a measurement on a reference signal in the first reference signal set is used to determine one or more antenna ports for transmitting the target reference signal.

9. The method according to claim 8, wherein the first radio resource is in a fixed position in the first radio resource set; or, an index of the first radio resource is a minimum value of indexes of all radio resources comprised in the first radio resource set.

10. The method according to claim 6, comprising at least one of:
transmitting second information;
executing the first reference signal; or
transmitting third information;
wherein the second information comprises configuration information of the first reference signal; the executing is transmitting, or, the executing is receiving; the third information indicates the first radio resource.

11. A UE for wireless communications, comprising:
a first receiver, receiving a first signaling, the first signaling comprises DCI; and
a first processor, transmitting a first radio signal, the first radio signal is transmitted on a PUSCH;
wherein the first signaling comprises scheduling information of the first radio signal;
a first reference signal is used to determine at least one of transmitting power of the first radio signal or one or more antenna ports for transmitting the first radio signal;
determination of an antenna port for transmitting the first radio signal comprises: using the first reference signal to determine a spatial domain transmission filter corresponding to the first radio signal;
a first radio resource is associated with the first reference signal, the first radio resource is a PUCCH resource, and the first radio resource is related to the first signaling;
the first signaling does not comprise a first field, and the first field is an SRS resource indicator field, the first field indicating one or more antenna ports for transmitting a radio signal scheduled by a signaling to which the first field belongs;
the first radio resource is related to the first signaling by using a time-frequency resource occupied by the first signaling to determine the first radio resource.

12. The UE according to claim 11, wherein the time-frequency resource occupied by the first signaling belongs to a first time-frequency resource set, and the first time-frequency resource set is associated with a second reference signal; the first radio resource is related to the second reference signal;
or, the time-frequency resource occupied by the first signaling belongs to a first time-frequency resource set, and the first time-frequency resource set is associated with a second reference signal; the first radio resource is related to the second reference signal; one antenna port for transmitting the first reference signal is Quasi-Co-Located (QCL) with one antenna port for transmitting the second reference signal, or, a measurement on the second reference signal is used to determine one or more antenna ports for transmitting the first reference signal.

13. The UE according to claim 11, wherein the first radio resource is a radio resource in a first radio resource set; the first radio resource set is a candidate resource set of K candidate resource sets, K being a positive integer greater than 1, and any of the K candidate resource sets comprising at least one radio resource; the first signaling is used to determine the first radio resource set out of the K candidate resource sets;
or, the first receiver receiving first information; wherein the first radio resource is a radio resource in a first radio resource set; the first radio resource set is a candidate resource set of K candidate resource sets, K being a positive integer greater than 1, and any of the K candidate resource sets comprising at least one radio resource; the first signaling is used to determine the first radio resource set out of the K candidate resource sets; the first information is used to determine K reference signal sets, the K reference signal sets respectively correspond to the K candidate resource sets, and a first reference signal set is one of the K reference signal sets that corresponds to the first radio resource set; a target radio resource is any radio resource in the first radio resource set, and the target radio resource is associated with a target reference signal; one antenna port for transmitting the target reference signal is QCL with one antenna port for transmitting a reference signal in the first reference signal set, or, a measurement on a reference signal in the first reference signal set is used to determine one or more antenna ports for transmitting the target reference signal.

14. The UE according to claim 13, wherein the first radio resource is in a fixed position in the first radio resource set; or, an index of the first radio resource is a minimum value of indexes of all radio resources comprised in the first radio resource set.

15. The UE according to claim 11, wherein the first receiver receives second information, wherein the second information comprises configuration information of the first reference signal;
or, the first processor operates the first reference signal, wherein the operating action is receiving, or, the operating action is transmitting;
or, the first receiver receives third information, wherein the third information indicates the first radio resource.

16. A base station for wireless communications, comprising:
a first transmitter, transmitting a first signaling, the first signaling comprises DCI; and
a processor, receiving a first radio signal, the first radio signal is transmitted on a PUSCH; wherein:
the first signaling comprises scheduling information of the first radio signal;
a first reference signal is used to determine at least one of transmitting power of the first radio signal or one or more antenna ports for transmitting the first radio signal;
determination of an antenna port for transmitting the first radio signal comprises: using the first reference signal to determine a spatial domain transmission filter corresponding to the first radio signal;
a first radio resource is associated with the first reference signal, the first radio resource is a PUCCH resource, and the first radio resource is related to the first signaling;
the first signaling does not comprise a first field, and the first field is an SRS resource indicator field, the first field indicating one or more antenna ports for transmitting a radio signal scheduled by a signaling to which the first field belongs;
the first radio resource is related to the first signaling by using a time-frequency resource occupied by the first signaling to determine the first radio resource.

17. The base station according to claim 16, wherein the time-frequency resource occupied by the first signaling belongs to a first time-frequency resource set, and the first time-frequency resource set is associated with a second reference signal; the first radio resource is related to the second reference signal;
or, the time-frequency resource occupied by the first signaling belongs to a first time-frequency resource set, and the first time-frequency resource set is associated with a second reference signal; the first radio resource is related to the second reference signal; one antenna port for transmitting the first reference signal is QCL with one antenna port for transmitting the second reference signal, or, a measurement on the second reference signal is used to determine one or more antenna ports for transmitting the first reference signal.

18. The base station according to claim 16, wherein the first radio resource is a radio resource in a first radio resource set; the first radio resource set is a candidate resource set of K candidate resource sets, K being a positive integer greater than 1, and any of the K candidate resource sets comprising at least one radio resource; the first signaling is used to determine the first radio resource set out of the K candidate resource sets;
or, the first transmitter transmitting first information; wherein the first radio resource is a radio resource in a first radio resource set; the first radio resource set is a candidate resource set of K candidate resource sets, K being a positive integer greater than 1, and any of the K candidate resource sets comprising at least one radio resource; the first signaling is used to determine the first radio resource set out of the K candidate resource sets; the first information is used to determine K reference signal sets, the K reference signal sets respectively correspond to the K candidate resource sets, and a first reference signal set is one of the K reference signal sets that corresponds to the first radio resource set; a target radio resource is any radio resource in the first radio resource set, and the target radio resource is associated with a target reference signal; one antenna port for transmitting the target reference signal is QCL with one antenna port for transmitting a reference signal in the first reference signal set, or, a measurement on a reference signal in the first reference signal set is used to determine one or more antenna ports for transmitting the target reference signal.

19. The base station according to claim 18, wherein the first radio resource is in a fixed position in the first radio resource set; or, an index of the first radio resource is a minimum value of indexes of all radio resources comprised in the first radio resource set.

20. The base station according to claim 16, wherein the first transmitter transmits second information, wherein the second information comprises configuration information of the first reference signal;
or, the processor executes the first reference signal, wherein the executing action is transmitting, or the executing action is receiving;
or, the first transmitter transmits third information, wherein the third information indicates the first radio resource.

* * * * *